US012334001B2

(12) United States Patent
Park et al.

(10) Patent No.: US 12,334,001 B2
(45) Date of Patent: *Jun. 17, 2025

(54) DISPLAY DEVICE

(71) Applicant: SAMSUNG DISPLAY CO., LTD., Yongin-si (KR)

(72) Inventors: Yongsung Park, Seoul (KR); Jieun Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,220

(22) Filed: Nov. 13, 2023

(65) Prior Publication Data

US 2024/0087508 A1 Mar. 14, 2024

Related U.S. Application Data

(63) Continuation of application No. 17/977,983, filed on Oct. 31, 2022, now Pat. No. 11,817,043.

(30) Foreign Application Priority Data

Nov. 8, 2021 (KR) ........................ 10-2021-0152281

(51) Int. Cl.
*G09G 3/32* (2016.01)
*G09G 3/3266* (2016.01)

(52) U.S. Cl.
CPC ............. *G09G 3/32* (2013.01); *G09G 3/3266* (2013.01); *G09G 2310/0216* (2013.01); *G09G 2310/0262* (2013.01)

(58) Field of Classification Search
CPC ......... G09G 3/3233; G09G 2300/0819; G09G 2300/0861; G09G 3/3258;
(Continued)

(56) References Cited

U.S. PATENT DOCUMENTS 7,911,423 B2 3/2011 Kim et al.
8,149,189 B2 4/2012 Kim et al.
(Continued)

FOREIGN PATENT DOCUMENTS

CN 101937647 B 9/2012
KR 10-2008-0082065 A 9/2008
(Continued)

*Primary Examiner* — Sujit Shah
(74) *Attorney, Agent, or Firm* — Womble Bond Dickinson (US) LLP

(57) ABSTRACT

A display device includes: a light emitting element; a first driving transistor between a first node and the light emitting element; a second driving transistor between the first node and the light emitting element; a switching transistor between a data line and the first node; a first compensation transistor between a first control electrode of the first driving transistor and a second node, and configured to receive a first compensation scan signal; a second compensation transistor between a second control electrode of the second driving transistor and the second node, and configured to receive a second compensation scan signal; a first initialization transistor between the first control electrode of the first driving transistor and a first initialization voltage line; and a second initialization transistor between the second control electrode of the second driving transistor and a second initialization voltage line.

21 Claims, 10 Drawing Sheets

(58) Field of Classification Search
CPC ..... G09G 2310/0262; G09G 2320/045; G09G 3/3291; G09G 2300/043; G09G 2320/0233; G09G 2320/0626; G09G 3/3225; G09G 3/32; G09G 2300/0439; G09G 2310/0264; G09G 3/3208; H10K 59/1216; H10K 59/131; H10K 59/1213; H10K 50/00; H10K 59/123
See application file for complete search history.

(56) References Cited

U.S. PATENT DOCUMENTS

| | | | | |
|---|---|---|---|---|
| 8,564,509 | B2 | 10/2013 | Shin et al. | |
| 11,817,043 | B2 * | 11/2023 | Park | G09G 3/3233 |
| 2006/0145968 | A1 | 7/2006 | You et al. | |
| 2015/0287361 | A1 * | 10/2015 | Lee | G09G 3/3233 315/172 |
| 2020/0074929 | A1 * | 3/2020 | Chen | G09G 3/3258 |
| 2020/0302860 | A1 * | 9/2020 | Kim | G09G 3/3258 |
| 2022/0351671 | A1 | 11/2022 | Xu et al. | |

FOREIGN PATENT DOCUMENTS

| | | | |
|---|---|---|---|
| KR | 10-1054327 | B1 | 8/2011 |
| KR | 10-1143009 | B1 | 5/2012 |
| KR | 10-1352119 | B1 | 1/2014 |

* cited by examiner

DISPLAY DEVICE

CROSS-REFERENCE TO RELATED APPLICATIONS

This application is a continuation of U.S. patent application Ser. No. 17/977,983, filed Oct. 31, 2022, which claims priority to and the benefit of Korean Patent Application No. 10-2021-0152281, filed Nov. 8, 2021, the entire content of both of which is incorporated herein by reference.

BACKGROUND

Aspects of some embodiments of the present disclosure described herein relate to a display device.

A light emitting display device display images by using a light emitting diode that generates a light through the recombination of electrons and holes. The light emitting display device is driven with relatively low power consumption while providing a relatively fast response speed.

The display device includes a display panel for displaying images, a scan driver for supplying a scan signal sequentially to scan lines included in the display panel, and a data driver for supplying data signals to data lines included in the display panel.

The above information disclosed in this Background section is only for enhancement of understanding of the background and therefore the information discussed in this Background section does not necessarily constitute prior art.

SUMMARY

Aspects of some embodiments of the present disclosure described herein relate to a display device, and for example, to a display device capable of improving a display quality.

Aspects of some embodiments of the present disclosure include a display device capable of improving a display quality by securing a time necessary to compensate for a hysteresis of a transistor included in a pixel.

According to some embodiments, a display device may include a display panel including a pixel.

According to some embodiments, the pixel may include a light emitting element, a first driving transistor that is connected between a first node and the light emitting element, a second driving transistor that is connected between the first node and the light emitting element, a switching transistor that is connected between a data line and the first node and receives a first scan signal, a first compensation transistor that is connected between a first control electrode of the first driving transistor and a second node and receives a first compensation scan signal, a second compensation transistor that is connected between a second control electrode of the second driving transistor and the second node and receives a second compensation scan signal, a first initialization transistor that is connected between the first control electrode of the first driving transistor and a first initialization voltage line and receives a second scan signal, and a second initialization transistor that is connected between the second control electrode of the second driving transistor and a second initialization voltage line and receives the second scan signal.

According to some embodiments, a display device may include a display panel that includes a pixel and displays an image during a plurality of frames, and a panel driver that drives the display panel.

According to some embodiments, the pixel may include a light emitting element, a first driving transistor that is connected between a first node and the light emitting element, a second driving transistor that is connected between the first node and the light emitting element, a switching transistor that is connected between a data line and the first node and receives a first scan signal, a first compensation transistor that is connected between a first control electrode of the first driving transistor and a second node and receives a first compensation scan signal, and a second compensation transistor that is connected between a second control electrode of the second driving transistor and the second node and receives a second compensation scan signal.

According to some embodiments, the panel driver may include a scan driver that maintains the second compensation scan signal in an inactive state during a first frame of the plurality of frames and maintains the first compensation scan signal in the inactive state during a second frame of the plurality of frames.

BRIEF DESCRIPTION OF THE FIGURES

The above and other characteristics and features of embodiments according to the present disclosure will become more apparent by describing in more detail aspects of some embodiments thereof with reference to the accompanying drawings.

DETAILED DESCRIPTION

Figure 1:
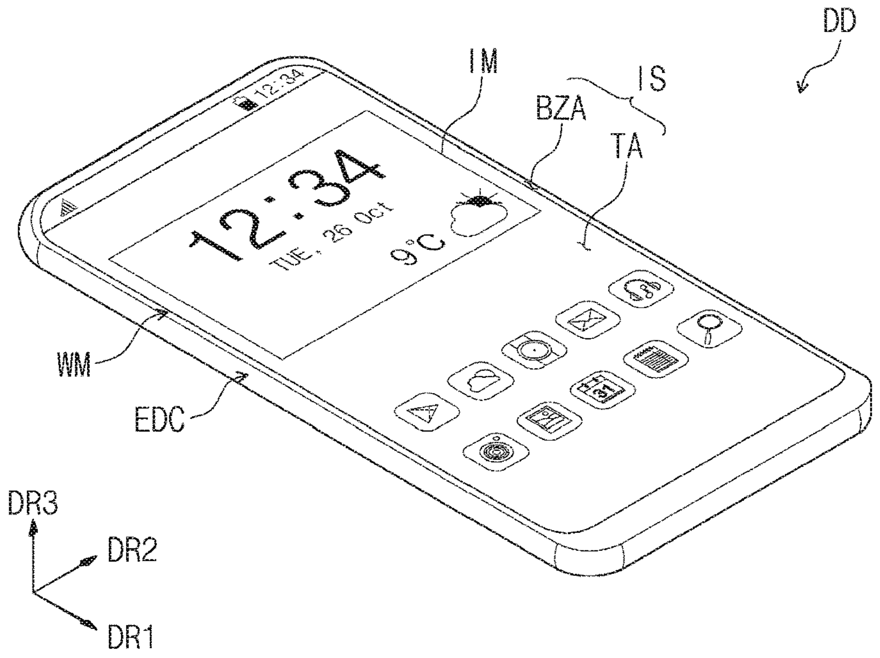
FIG. 1 is a perspective view of a display device according to some embodiments of the present disclosure.

In the specification, the expression that a first component (or area, layer, part, portion, etc.) is "on", "connected with", or "coupled to" a second component means that the first component is directly on, connected with, or coupled to the second component or means that a third component is interposed therebetween.

The same reference numeral refers to the same component. Also, in drawings, thicknesses, proportions, and dimensions of components may be exaggerated to describe the technical features effectively. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the invention, a first component may be referred to as a second component, and similarly, the second component may be referred to as the first component. The singular forms are intended to include the plural forms unless the context clearly indicates otherwise.

Also, the terms "under", "below", "on", "above", etc. are used to describe the correlation of components illustrated in drawings. The terms are relative and are described with reference to a direction indicated in the drawing.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, aspects of some embodiments of the present disclosure will be described in more detail with reference to accompanying drawings.

Figure 2:
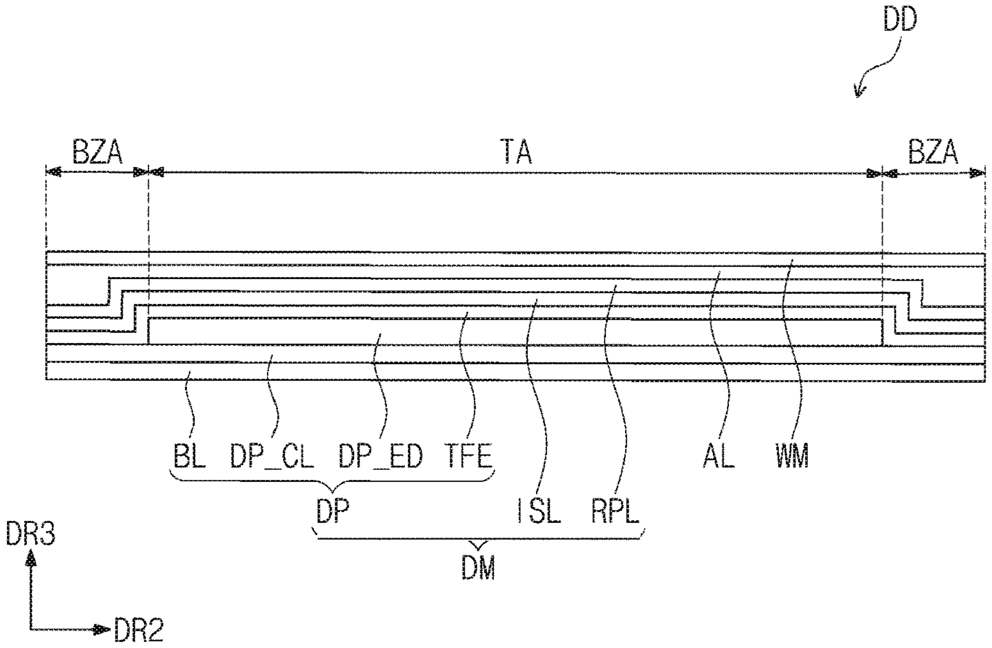
FIG. 2 is a cross-sectional view of a display device, according to some embodiments of the present disclosure.

FIG. 1 is a perspective view of a display device according to some embodiments of the present disclosure, and FIG. 2 is a cross-sectional view of a display device according to some embodiments of the present disclosure.

Referring to FIGS. 1 and 2, a display device DD according to some embodiments of the present disclosure may be in the shape of a rectangle having long edges (or sides) parallel to a first direction DR1 and short edges (or sides) parallel to a second direction DR2 intersecting the first direction DR1. However, embodiments according to the present disclosure are not limited thereto. For example, the display device DD may have various shapes such as a circle and a polygon.

The display device DD may be a device that is activated depending on an electrical signal. The display device DD may include various embodiments. For example, the display device DD may be applied to an electronic device such as a smart watch, a tablet, a notebook, a computer, or a smart television.

Below, a normal direction that is substantially perpendicular or normal with respect to a plane defined by the first direction DR1 and the second direction DR2 is defined as a third direction DR3. In the specification, the meaning of "when viewed from above a plane" or "in a plan view" may mean "when viewed from the third direction DR3".

An upper surface of the display device DD may be defined as a display surface IS and may have the plane defined by the first direction DR1 and the second direction DR2. Images IM generated by the display device DD may be displayed or provided to the user through the display surface IS.

The display surface IS may be divided into a transparent area TA and a bezel area BZA. The transparent area TA may be an area in which the images IM are displayed. The user visually perceives the images IM through the transparent area TA. According to some embodiments, the transparent area TA is illustrated in the shape of a quadrangle whose vertexes are rounded. However, this is illustrated as an example. The transparent area TA may have various shapes and embodiments according to the present disclosure are not limited to any one shape.

The bezel area BZA is adjacent to the transparent area TA. The bezel area BZA may have a given color (e.g., a set or predetermined color). The bezel area BZA may surround the transparent area TA. Accordingly, the shape of the transparent area TA may be defined substantially by the bezel area BZA. However, this is illustrated as an example. The bezel area BZA may be located adjacent to only one side of the transparent area TA or may be omitted.

The display device DD may sense an external input applied from the outside. The external input may include various types of inputs provided from the outside of the display device DD. For example, as well as a contact by a part of a body such as a hand of the user, the external input may include an external input (e.g., hovering) applied when the user's hand comes close to the display device DD or is adjacent to the display device DD within a given distance. Also, the external input may have various types such as a force, a pressure, a temperature, and a light.

The display device DD may sense biometric information of the user that is applied from the outside. A biometric information sensing area capable of sensing the biometric information of the user may be provided on the display surface IS of the display device DD. The biometric information sensing area may be provided in the whole area of the transparent area TA or may be located in a portion of the transparent area TA. An example in which the entire transparent area TA is utilized as the biometric information sensing area is illustrated in FIG. 1, but embodiments according to the present disclosure are not limited thereto. For example, the biometric information sensing area may be implemented with a portion of the transparent area TA.

The display device DD may include a window WM, a display module DM, and a housing EDC. According to some embodiments, the window WM and the housing EDC are coupled to each other to form the exterior of the display device DD.

A front surface of the window WM defines the display surface IS of the display device DD. The window WM may include an optically transparent material. For example, the window WM may include glass or plastic. The window WM may include a multi-layer structure or a single layer structure. For example, the window WM may include a plurality of plastic films bonded by an adhesive or may have a glass substrate and a plastic film bonded by an adhesive.

The display module DM may include a display panel DP and an input sensing layer ISL. The display panel DP may display images according to an electrical signal, and the input sensing layer ISL may sense an external input applied from the outside. The external input may be provided in various forms from the outside, for example, a touch input, a stylus, etc.

The display panel DP according to some embodiments of the present disclosure may be a light emitting display panel and is not particularly limited thereto. For example, the display panel DP may be an organic light emitting display panel, an inorganic light emitting display panel, or a quantum dot light emitting display panel. An emission layer of the organic light emitting display panel may include an organic light emitting material, and an emission layer of the inorganic light emitting display panel may include an inorganic light emitting material. An emission layer of the quantum dot light emitting display panel may include a quantum dot, a quantum rod, or the like. Below, the description will be given as the display panel DP is the organic light emitting display panel.

Referring to FIG. 2, the display panel DP includes a base layer BL, a circuit layer DP_CL, an element layer DP_ED, and an encapsulation layer TFE. The display panel DP according to some embodiments of the present disclosure may be a flexible display panel. However, embodiments according to the present disclosure are not limited thereto. For example, the display panel DP may be a foldable display panel, which is configured to be folded about to a folding axis, or a rigid display panel.

The base layer BL may include a synthetic resin layer. The synthetic resin layer may be a polyimide-based resin layer, and the material thereof is not particularly limited. Besides, the base layer BL may include a glass substrate, a metal substrate, an organic/inorganic composite material substrate, or the like.

The circuit layer DP_CL is located on the base layer BL. The circuit layer DP_CL includes at least one insulating layer and a circuit element. Below, the insulating layer included in the circuit layer DP_CL is referred to as an "intermediate insulating layer". The intermediate insulating layer includes at least one intermediate inorganic film and at least one intermediate organic film. The circuit element may include a pixel driving circuit included in each of a plurality of pixels for displaying an image and a sensor driving circuit included in each of a plurality of sensors for recognizing external information. The external information may be biometric information. As an example of the present disclosure, the sensor may include a fingerprint recognition sensor, a proximity sensor, an iris recognition sensor, or the like. Also, the sensor may include an optical sensor that recognizes biometric information in an optical manner. The circuit layer DP_CL may further include signal lines connected with the pixel driving circuit and the sensor driving circuit.

The element layer DP_ED may include a light emitting element included in each of the pixels and a light sensing element included in each of the sensors. As an example of the present disclosure, the light sensing element may be a photodiode. An optical fingerprint sensor may detect a light reflected by a fingerprint of the user. The circuit layer DP_CL and the element layer DP_ED will be described in detail with reference to FIGS. 12, 13A, and 13B.

The encapsulation layer TFE encapsulates the element layer DP_ED. The encapsulation layer TFE may include at least one organic film and at least one inorganic film. The inorganic film may include an inorganic material and may protect the element layer DP_ED from moisture/oxygen. The inorganic film may include a silicon nitride layer, a silicon oxynitride layer, a silicon oxide layer, a titanium oxide layer, an aluminum oxide layer, or the like, but is not limited particularly thereto. The organic film may include an organic material and may protect the element layer DP_ED from foreign objects or contaminants such as dust particles.

The input sensing layer ISL may be formed on the display panel DP. The input sensing layer ISL may be directly arranged on the encapsulation layer TFE. According to some embodiments of the present disclosure, the input sensing layer ISL may be formed on the display panel DP through a subsequent process. That is, when the input sensing layer ISL is directly arranged on the display panel DP, an adhesive film is not arranged between the input sensing layer ISL and the encapsulation layer TFE. However, alternatively, an inner adhesive film may be arranged between the input sensing layer ISL and the display panel DP. In this case, the input sensing layer ISL may not be manufactured by a process continuous (or subsequent) to that of the display panel DP. That is, the input sensing layer ISL may be manufactured through a process separate from that of the display panel DP and may then be fixed on an upper surface of the display panel DP by the inner adhesive film.

The input sensing layer ISL may sense an external input (e.g., a touch of the user), may change the sensed input into a given input signal, and may provide the input signal to the display panel DP. The input sensing layer ISL may include a plurality of sensing electrodes for sensing an external input. The sensing electrodes may sense the external input in a capacitive manner. The display panel DP may receive the input signal from the input sensing layer ISL and may generate an image corresponding to the input signal.

The display module DM may further include an anti-reflection layer RPL. The anti-reflection layer RPL may reduce the reflectance of an external light incident from the outside of the display device DD. As an example of the present disclosure, the anti-reflection layer RPL may be located on the input sensing layer ISL. However, embodiments according to the present disclosure are not limited thereto. The anti-reflection layer RPL may be interposed between the display panel DP and the input sensing layer ISL. The anti-reflection layer RPL may include a plurality of color filters and a black matrix. The color filters may have a given arrangement. For example, the color filters may be arranged in consideration of colors of lights emitted from pixels included in the display panel DP. However, the configuration of the anti-reflection layer RPL is not limited thereto. Alternatively, the anti-reflection layer RPL may be replaced with a polarizing film. The polarizing film may be coupled to the input sensing layer ISL through an adhesive layer.

The display device DD according to some embodiments of the present disclosure may further include an adhesive layer AL. The window WM may be attached to the input sensing layer ISL by the adhesive layer AL. The adhesive layer AL may include an optical clear adhesive, an optically clear adhesive resin, or a pressure sensitive adhesive (PSA).

The housing EDC is coupled to the window WM. The housing EDC is coupled to the window WM to provide a given inner space. The display module DM may be accommodated in the inner space. The housing EDC may include a material having relatively high rigidity. For example, the housing EDC may include glass, plastic, or metal or may include a plurality of frames and/or plates that are composed of a combination thereof. The housing EDC may stably protect components of the display device DD accommodated in the inner space from an external impact. According to some embodiments, a battery module supplying a power necessary for an overall operation of the display device DD may be interposed between the display module DM and the housing EDC.

Figure 3:
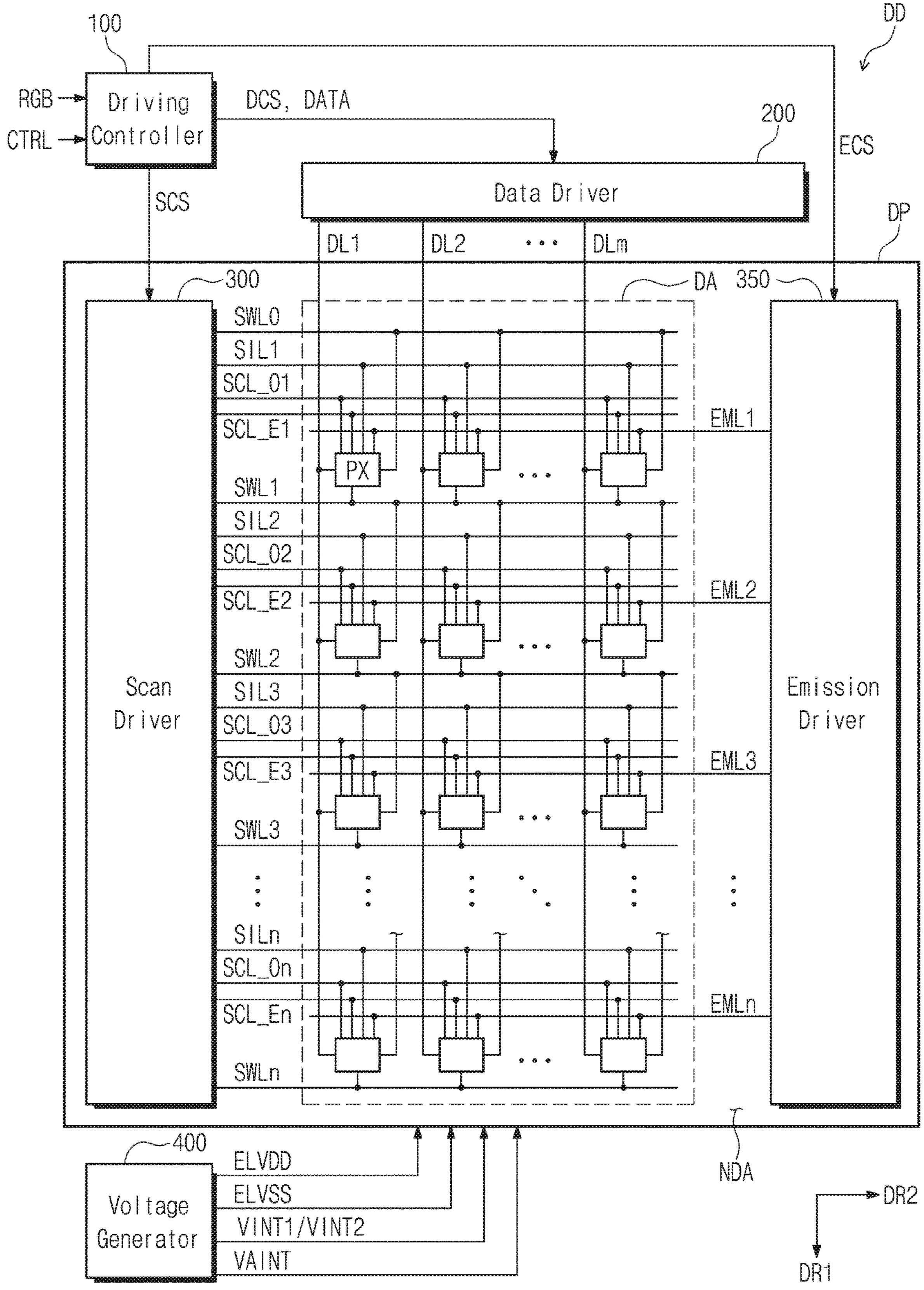
FIG. 3 is a block diagram of a display device according to some embodiments of the present disclosure.

FIG. 3 is a block diagram of a display device according to some embodiments of the present disclosure.

Referring to FIG. 3, the display device DD includes the display panel DP, a panel driver for driving the display panel DP, and a driving controller 100 for controlling an operation of the panel driver. According to some embodiments of the present disclosure, the panel driver includes a data driver 200, a scan driver 300, an emission driver 350, and a voltage generator 400.

The driving controller 100 receives an input image signal RGB and a control signal CTRL. The driving controller 100 generates image data "DATA" by converting a data format of the input image signal RGB in compliance with the specification for an interface with the data driver 200. The driving controller 100 generates a first driving control signal SCS, a second driving control signal DCS, and a third driving control signal ECS.

The data driver 200 receives the second driving control signal DCS and the image data "DATA" from the driving controller 100. The data driver 200 converts the image data "DATA" into data signals and outputs the data signals to a plurality of data lines DL1 to DLm to be described in more detail below. The data signals refer to analog voltages corresponding to a grayscale value of the image data "DATA".

The scan driver 300 receives the first driving control signal SCS from the driving controller 100. The scan driver 300 may output scan signals to scan lines in response to the first driving control signal SCS.

The voltage generator 400 generates voltages necessary for an operation of the display panel DP. According to some embodiments, the voltage generator 400 generates a first driving voltage ELVDD, a second driving voltage ELVSS, a first initialization voltage VINT1, a second initialization voltage VINT2, and a third initialization voltage VAINT.

The display panel DP includes initialization scan lines SIL1 to SILn, odd compensation scan lines SCL_O1 to SCL_On, even compensation scan lines SCL_E1 to SCL_En, write scan lines SWL0 to SWLn, emission control lines EML1 to EMLn, the data lines DL1 to DLm, and pixels PX. According to some embodiments, the display panel DP may further include black scan lines. The initialization scan lines SIL1 to SILn, the odd compensation scan lines SCL_O1 to SCL_On, the even compensation scan lines SCL_E1 to SCL_En, the write scan lines SWL0 to SWLn, the emission control lines EML1 to EMLn, the data lines DL1 to DLm, and the pixels PX may be located in a display area DA. The initialization scan lines SIL1 to SILn, the odd compensation scan lines SCL_O1 to SCL_On, the even compensation scan lines SCL_E1 to SCL_En, the write scan lines SWL0 to SWLn, and the emission control lines EML1 to EMLn extend in the second direction DR2. The initialization scan lines SIL1 to SILn, the odd compensation scan lines SCL_O1 to SCL_On, the even compensation scan lines SCL_E1 to SCL_En, the write scan lines SWL0 to SWLn, and the emission control lines EML1 to EMLn are arranged to be spaced from each other in the first direction DR1. The data lines DL1 to DLm extend in the first direction DR1 and are arranged to be spaced from each other in the second direction DR2.

The pixels PX are electrically connected with the initialization scan lines SIL1 to SILn, the odd compensation scan lines SCL_O1 to SCL_On, the even compensation scan lines SCL_E1 to SCL_En, the write scan lines SWL0 to SWLn, the emission control lines EML1 to EMLn, and the data lines DL1 to DLm. Each of the pixels PX may be electrically connected with five scan lines. For example, pixels in the first row may be connected with the first initialization scan line SIL1, the first odd compensation scan line SCL_O1, the first even compensation scan line SCL_E1, a dummy write scan line SWL0, and the first write scan line SWL1. Also, the pixels in the second row may be connected with the second initialization scan line SIL2, the second odd compensation scan line SCL_O2, the second even compensation scan line SCL_E2, and the first and second write scan lines SWL1 and SWL2.

The scan driver 300 may be located in a non-display area NDA of the display panel DP. The scan driver 300 receives the first driving control signal SCS from the driving controller 100. In response to the first driving control signal SCS, the scan driver 300 may output initialization scan signals to the initialization scan lines SIL1 to SILn and may output write scan signals to the write scan lines SWL0 to SWLn. Also, in response to the first driving control signal SCS, the scan driver 300 may output odd compensation scan signals to the odd compensation scan lines SCL_O1 to SCL_On and may output even compensation scan signals to the even compensation scan lines SCL_E1 to SCL_En. A circuit configuration and an operation of the scan driver 300 will be described in detail later.

The emission driver 350 receives the third driving control signal ECS from the driving controller 100. The emission driver 350 may output emission control signals to the emission control lines EML1 to EMLn in response to the third driving control signal ECS. According to some embodiments, the scan driver 300 may be connected with the emission control lines EML1 to EMLn. In this case, the scan driver 300 may output emission control signals to the emission control lines EML1 to EMLn.

Each of the pixels PX includes a light emitting element ED (refer to FIG. 4) and a pixel circuit unit controlling a light emitting operation of the light emitting element ED. The pixel circuit unit may include a plurality of transistors and a capacitor. The scan driver 300 and the emission driver 350 may include transistors formed through the same process as the pixel circuit unit.

Each of the pixels PX receives the first driving voltage ELVDD, the second driving voltage ELVSS, the first initialization voltage VINT1, the second initialization voltage VINT2, and the third initialization voltage VAINT from the voltage generator 400.

Figure 4:
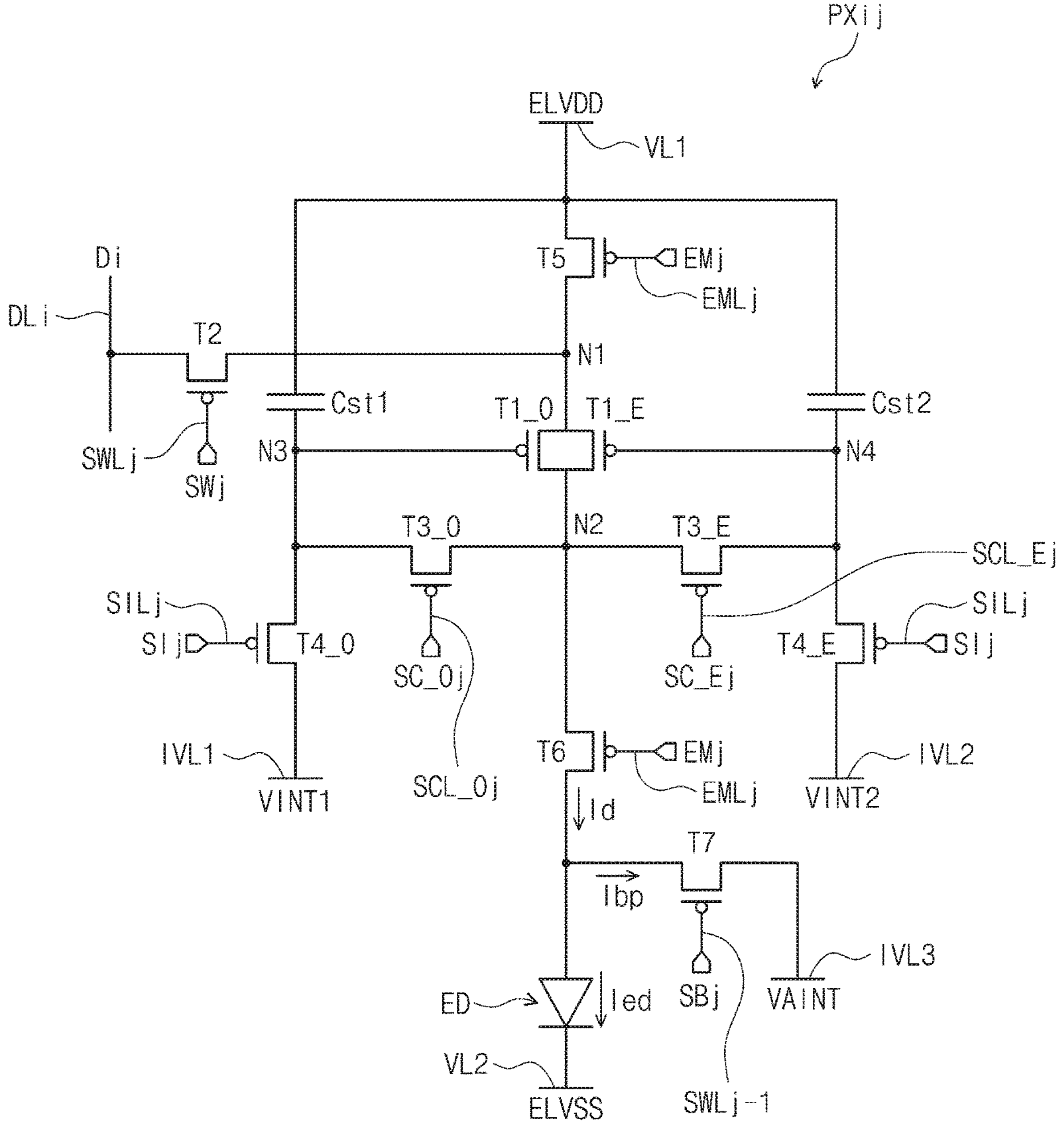
FIG. 4 is a circuit diagram of a pixel according to some embodiments of the present disclosure.
Figure 5A:
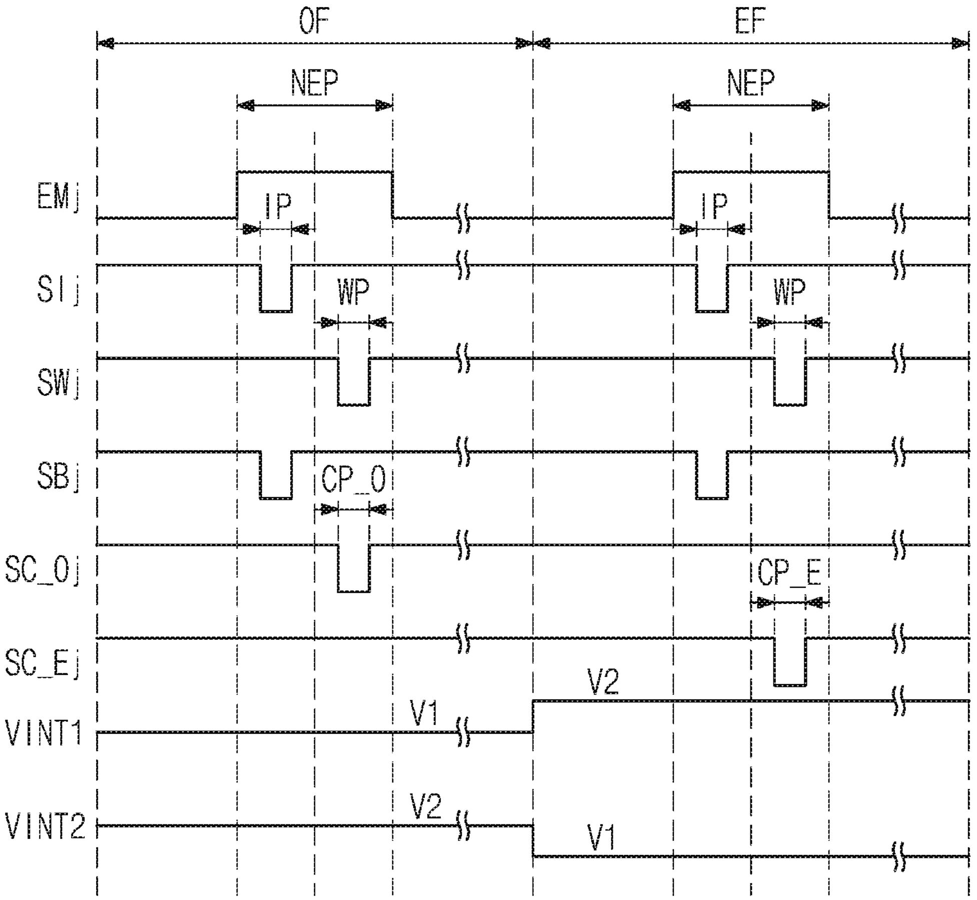
FIG. 5A is a timing diagram for describing an operation of a pixel illustrated in FIG. 4, according to some embodiments of the present disclosure.
Figure 5B:
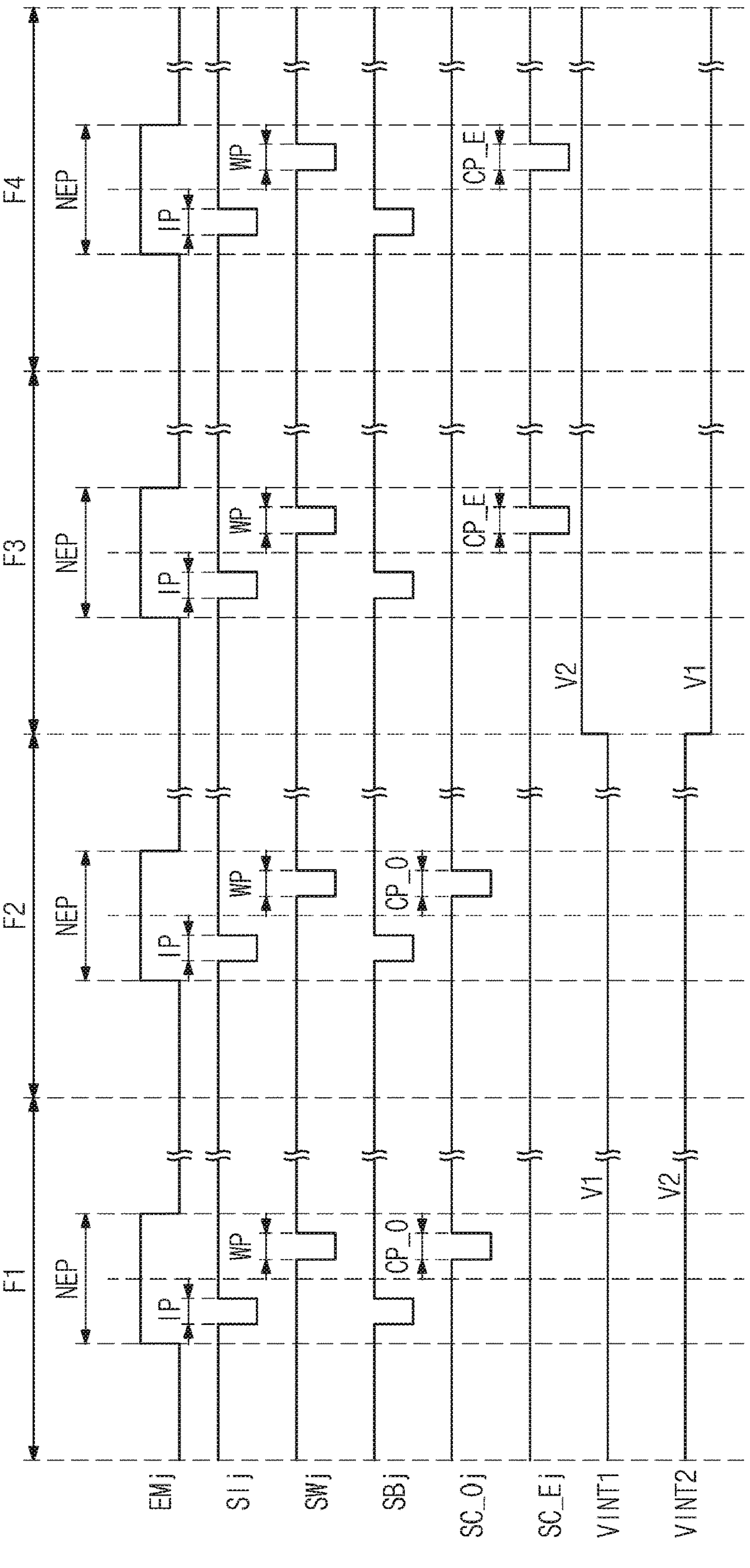
FIG. 5B is a timing diagram for describing an operation of a pixel illustrated in FIG. 4, according to some embodiments of the present disclosure.

FIG. 4 is a circuit diagram of a pixel according to some embodiments of the present disclosure. FIG. 5A is a timing diagram for describing an operation of a pixel illustrated in FIG. 4, according to some embodiments of the present disclosure. FIG. 5B is a timing diagram for describing an operation of a pixel illustrated in FIG. 4, according to some embodiments of the present disclosure.

An equivalent circuit of one pixel PXij of a plurality of pixels illustrated in FIG. 3 is illustrated in FIG. 4. Below, a circuit structure of the pixel PXij will be described. The plurality of pixels have the same structure, and thus, additional description associated with the remaining pixels will be omitted to avoid redundancy. The pixel PXij is connected with the i-th data line (hereinafter referred to as a "data line") DLi of the data lines DL1 to DLm and the j-th emission control line (hereinafter referred to as an "emission control line") EMLj of the emission control lines EML1 to EMLn. The pixel PXij is connected with the j-th initialization scan line (hereinafter referred to as an "initialization scan line") SILj of the initialization scan lines SIL1 to SILn, and the (j−1)-th write scan line (hereinafter referred to as a "black scan line") SWLj−1 and the j-th write scan line (hereinafter referred to as a "write scan line") SWLj of the write scan lines SWL0 to SWLn. Also, the pixel PXij is connected with the j-th odd compensation scan line SCL_Oj (hereinafter referred to as an "odd compensation scan line") of the odd compensation scan lines SCL_O1 to SCL_On and the j-th even compensation scan line SCL_Ej (hereinafter referred to as an "even compensation scan line") of the even compensation scan lines SCL_E1 to SCL_En. Alternatively, the pixel PXij may be connected with a j-th black scan line instead of the (j−1)-th write scan line SWLj−1.

The pixel PXij includes the light emitting element ED and the pixel circuit unit. The light emitting element ED may be a light emitting diode. The light emitting diode may include an organic light emitting material, an inorganic light emitting material, a quantum dot, a quantum rod, or the like as an emission layer.

The pixel circuit unit includes first and second driving transistors T1_O and T1_E, a switching transistor T2, first and second compensation transistors T3_O and T3_E, and first and second initialization transistors T4_O and T4_E. The pixel circuit unit further includes first and second capacitors Cst1 and Cst2, first and second emission control transistors T5 and T6, and a third initialization transistor T7. Each of the first and second driving transistors T1_O and T1_E, the switching transistor T2, the first and second compensation transistors T3_O and T3_E, the first and second initialization transistors T4_O and T4_E, the first and second emission control transistors T5 and T6, and the third initialization transistor T7 may be a transistor having a low-temperature polycrystalline silicon (LTPS) semiconductor layer. All of the first and second driving transistors T1_O and T1_E, the switching transistor T2, the first and second compensation transistors T3_O and T3_E, the first and second initialization transistors T4_O and T4_E, the first and second emission control transistors T5 and T6, and the third initialization transistor T7 may be implemented with a P-type transistor. However, embodiments according to the present disclosure are not limited thereto. As an example, all the ten transistors T1_O, T1_E, T2, T3_O, T3_E, T4_O, T4_E, T5, T6, and T7 may be implemented with an N-type transistor.

As another example, some of the ten transistors T1_O, T1_E, T2, T3_O, T3_E, T4_O, T4_E, T5, T6, and T7 may be implemented with a P-type transistor, and the remaining transistors thereof may be implemented with an N-type transistor. The configuration of the pixel circuit unit according to embodiments of the present disclosure is not limited to the embodiments described with respect to FIG. 4. The pixel circuit unit illustrated in FIG. 4 is only an example. For example, the configuration of the pixel circuit unit may be modified and implemented.

The initialization scan line SILj may transfer a j-th initialization scan signal (hereinafter referred to as an "initialization scan signal") SIj received from the scan driver 300 (refer to FIG. 3) to the pixel PXij. The odd compensation scan line SCL_Oj may transfer a j-th odd compensation scan signal (hereinafter referred to as an "odd compensation scan signal") SC_Oj received from the scan driver 300 to the pixel PXij, and the even compensation scan line SCL_Ej may transfer a j-th even compensation scan signal (hereinafter referred to as an "even compensation scan signal") SC_Ej received from the scan driver 300 to the pixel PXij. The black scan line SWLj−1 may transfer a (j−1)-th write scan signal (hereinafter referred to as a "black scan signal") SBj received from the scan driver 300 to the pixel PXij, and the write scan line SWLj may transfer a j-th write scan signal (hereinafter referred to as a "write scan signal") SWj received from the scan driver 300 to the pixel PXij. The emission control line EMLj may transfer a j-th emission control signal (hereinafter referred to as an "emission control signal") EMj received from the emission driver 350 (refer to FIG. 3) to the pixel PXij. The data line DLi transfers a data signal Di received from the data driver 200 (refer to FIG. 3) to the pixel PXij. The data signal Di may have a voltage level corresponding to a grayscale of a relevant image signal of the image signal RGB input to the display device DD (refer to FIG. 3).

First and second driving voltage lines VL1 and VL2 may respectively transfer the first and second driving voltages ELVDD and ELVSS received from the voltage generator 400 (refer to FIG. 3) to the pixel PXij. First and second initialization voltage lines IVL1 and IVL2 may respectively transfer the first and second initialization voltages VINT1 and VINT2 received from the voltage generator 400 to the pixel PXij. A third initialization voltage line IVL3 may transfer the third initialization voltage VAINT received from the voltage generator 400 to the pixel PXij.

Each of the first and second driving transistors T1_O and T1_E may be connected between a first node N1 and the light emitting element ED. The first and second driving transistors T1_O and T1_E may be connected in parallel. The first driving transistor T1_O includes a first electrode connected with the first node N1, a second electrode connected with an anode of the light emitting element ED through the sixth transistor T6, and a first control electrode connected with a first end (hereinafter referred to as a "third node N3") of the first capacitor Cst1. The second driving transistor T1_E includes a first electrode connected with the first node N1, a second electrode connected with the anode of the light emitting element ED through the sixth transistor T6, and a second control electrode connected with a first end (hereinafter referred to as a "fourth node N4") of the second capacitor Cst2. The first electrode of the first driving transistor T1_O and the first electrode of the second driving transistor T1_E may be connected in common with the first node N1, and the second electrode of the first driving transistor T1_O and the second electrode of the second driving transistor T1_E may be connected in common with a second node N2.

The first driving transistor T1_O may operate depending on a potential of the third node N3, and the second driving transistor T1_E may operate depending on a potential of the fourth node N4. As an example of the present disclosure, the first and second driving transistors T1_O and T1_E may be turned on alternately in units of at least one frame.

When the data signal Di that the data line DLi transfers is applied to the first node N1 depending on a switching operation of the switching transistor T2, a driving current Id may be supplied to the light emitting element ED through one transistor turned on from among the first and second driving transistors T1_O and T1_E.

The switching transistor T2 includes a first electrode connected with the data line DLi, a second electrode connected with the first electrodes of the first and second driving transistors T1_O and T1_E, and a gate electrode connected with the write scan line SWLj. The switching transistor T2 may be turned on depending on the write scan signal SWj transferred through the write scan line SWLj and may then transfer the data signal Di transferred from the data line DLi to the first node N1.

The first compensation transistor T3_O is connected between the first control electrode of the first driving transistor T1_O and the second node N2, and the second compensation transistor T3_E is connected between the second control electrode of the second driving transistor T1_E and the second node N2. The first compensation transistor T3_O includes a first electrode connected with the second node N2, a second electrode connected with the first control electrode of the first driving transistor T1_O, and a control electrode connected with the odd compensation scan line SCL_Oj. The second compensation transistor T3_E includes a first electrode connected with the second node N2, a second electrode connected with the second control electrode of the second driving transistor T1_E, and a control electrode connected with the even compensation scan line SCL_Ej.

The first compensation transistor T3_O is turned on depending on an odd compensation scan signal (or referred to as a "first compensation scan signal") SC_Oj transferred through the odd compensation scan line SCL_Oj. The first control electrode and the second electrode of the first driving transistor T1_O may be connected with each other by the turned-on first compensation transistor T3_O. That is, the first driving transistor T1_O may be diode-connected by the turned-on first compensation transistor T3_O. The second compensation transistor T3_E is turned on depending on an even compensation scan signal (or referred to as a "second compensation scan signal") SC_Ej transferred through the even compensation scan line SCL_Ej. The second control electrode and the second electrode of the second driving transistor T1_E may be connected with each other by the turned-on second compensation transistor T3_E. That is, the second driving transistor T1_E may be diode-connected by the turned-on second compensation transistor T3_E.

The first initialization transistor T4_O is connected between the third node N3 and the first initialization voltage line IVL1, and the second initialization transistor T4_E is connected between the fourth node N4 and the second initialization voltage line IVL2. The first initialization transistor T4_O includes a first electrode connected with the first control electrode of the first driving transistor T1_O, a second electrode connected with the first initialization voltage line IVL1, and a control electrode connected with the initialization scan line SILj. The second initialization transistor T4_E includes a first electrode connected with the second control electrode of the second driving transistor T1_E, a second electrode connected with the second initialization voltage line IVL2, and a control electrode connected with the initialization scan line SILj. As an example of the present disclosure, the first initialization voltage VINT1 is transferred to the first initialization voltage line IVL1, and the second initialization voltage VINT2 is transferred to the second initialization voltage line IVL2.

The first and second initialization transistors T4_O and T4_E may be simultaneously (or concurrently) turned on depending on the initialization scan signal SIj transferred through the initialization scan line SILj. The first initialization voltage VINT1 is transferred to the first control electrode of the first driving transistor T1_O through the turned-on first initialization transistor T4_O, and the second initialization voltage VINT2 is transferred to the second control electrode of the second driving transistor T1_E through the turned-on second initialization transistor T4_E. According to some embodiments of the present disclosure, a voltage level of the first initialization voltage VINT1 may vary in units of at least one frame, and a voltage level of the second initialization voltage VINT2 may vary in units of at least one frame. The first initialization voltage VINT1 and the second initialization voltage VINT2 may have different voltage levels in one frame.

The first emission control transistor T5 includes a first electrode connected with the first driving voltage line VL1, a second electrode connected with the first node N1, and a control electrode connected with the emission control line EMLj. The second emission control transistor T6 includes a first electrode connected with the second node N2, a second electrode connected with the anode of the light emitting element ED, and a control electrode connected with the emission control line EMLj.

The first and second emission control transistors T5 and T6 are simultaneously (or concurrently) turned on depending on the emission control signal EMj transferred through the emission control line EMLj. The first driving voltage ELVDD applied through the turned-on first emission control transistor T5 may be compensated for through one transistor turned on from among the first and second driving transistors T1_O and T1_E so as to be transferred to the light emitting element ED.

The structure in which the first and second emission control transistors T5 and T6 are connected with the same emission control line EMLj is illustrated in FIG. 4, but the present disclosure is not limited thereto. Alternatively, the first and second emission control transistors T5 and T6 may be connected with different emission control lines to receive different emission control signals.

The third initialization transistor T7 includes a first electrode connected with the second electrode of the second emission control transistor T6, a second electrode connected with the third initialization voltage line IVL3 through which the third initialization voltage VAINT is transferred, and a control electrode connected with the black scan line SWLj−1. The third initialization transistor T7 may be turned on in response to a black scan signal (or referred to as a "third scan signal") SBj transferred through the black scan line SWLj−1, and the third initialization voltage VAINT may be applied to the anode of the light emitting element ED through the turned-on third initialization transistor T7.

The first end of the first capacitor Cst1 is connected with the first control electrode of the first driving transistor T1_O, and a second end thereof is connected with the first driving voltage line VL1. The first end of the second capacitor Cst2 is connected with the second control electrode of the second driving transistor T1_E, and a second end thereof is connected with the first driving voltage line VL1. A cathode of the light emitting element ED may be connected with the second driving voltage line VL2 transferring the second driving voltage ELVSS.

Referring to FIGS. 4 and 5A, the display panel DP (refer to FIG. 3) may display an image during a plurality of frames. Two frames (i.e., first and second frames OF and EF) of a plurality of frames are illustrated in FIG. 5A. According to some embodiments of the present disclosure, the first frame OF may be an odd-numbered frame, and the second frame EF may be an even-numbered frame.

Each of the first and second frames OF and EF includes an inactive period (i.e., capable of being called a "non-emission period") of the emission control signal EMj. In the first frame OF, the initialization scan signal SIj, the write scan signal SWj, the black scan signal SBj, and the odd compensation scan signal SC_Oj may be activated during a portion of a non-emission period NEP.

During an initialization period IP of the first frame OF, when the activated initialization scan signal SIj is provided to the initialization scan line SILj, the first and second initialization transistors T4_O and T4_E are simultaneously (or concurrently) turned on in response to the activated initialization scan signal SIj. The first initialization voltage VINT1 is transferred to the first control electrode of the first driving transistor T1_O through the turned-on first initialization transistor T4_O, and the first control electrode of the first driving transistor T1_O is initialized by the first initialization voltage VINT1. The second initialization voltage VINT2 is transferred to the second control electrode of the second driving transistor T1_E through the turned-on second initialization transistor T4_E, and an off bias may be formed at the second driving transistor T1_E by the second initialization voltage VINT2. According to some embodiments of the present disclosure, because the first and second initialization transistors T4_O and T4_E are P-type transistors, the initialization scan signal SIj may have a negative voltage level during the active period and may have a positive voltage level during the inactive period. However, the present disclosure is not limited thereto. For example, in the case where the first and second initialization transistors T4_O and T4_E are N-type transistors, the initialization scan signal SIj may have a positive voltage level during the active period and may have a negative voltage level during the inactive period.

According to some embodiments of the present disclosure, the first initialization voltage VINT1 may have a first voltage level V1 during the first frame OF, and the second initialization voltage VINT2 has a second voltage level V2 different from the first voltage level V1. According to some embodiments of the present disclosure, because the first and second driving transistors T1_O and T1_E are P-type transistors, the first voltage level V1 may have a negative voltage level, and the second voltage level V2 may have a positive voltage level higher than the first voltage level V1. For example, the first voltage level V1 may be about −4.5 V, and the second voltage level V2 may be about 4.6 V. However, the present disclosure is not limited thereto. In the case where the first and second driving transistors T1_O and T1_E are N-type transistors, the first voltage level V1 may have a positive voltage level, and the second voltage level V2 may have a negative voltage level lower than the first voltage level V1.

According to some embodiments of the present disclosure, the black scan signal SBj may be activated at the same time with the initialization scan signal SIj. That is, an active period of the black scan signal SBj may overlap an active period of the initialization scan signal SIj.

When the activated black scan signal SBj is provided to the black scan line SWLj−1, the third initialization transistor T7 is turned on in response to the activated black scan signal SBj. The third initialization voltage VAINT is transferred to the anode of the light emitting element ED through the turned-on third initialization transistor T7. That is, during the initialization period IP, the anode of the light emitting element ED is initialized by the third initialization voltage VAINT. As an example of the present disclosure, the third initialization voltage VAINT may have a third voltage level different from the first and second voltage levels V1 and V2.

Next, during a write period WP of the first frame OF, when the activated write scan signal SWj is supplied to the write scan line SWLj, the switching transistor T2 is turned on. According to some embodiments of the present disclosure, the write period WP may not overlap the initialization period IP. The initialization period IP may come before the write period WP.

During a compensation period CP_O of the first frame OF (i.e., capable of being called an "odd compensation period" or a "first compensation period"), when the activated odd compensation scan signal SC_Oj is supplied to the odd compensation scan line SCL_Oj, the first compensation transistor T3_O is turned on. During the first frame OF, the even compensation scan signal SC_Ej is maintained in an inactive state. Accordingly, during the first frame OF, the second compensation transistor T3_E may be maintained in the turn-off state.

According to some embodiments of the present disclosure, because the first compensation transistor T3_O is a P-type transistor, the odd compensation scan signal SC_Oj may have a negative voltage level during the active period and may have a positive voltage level during the inactive period. Also, because the second compensation transistor T3_E is a P-type transistor, the even compensation scan signal SC_Ej may have a positive voltage level during the first frame OF. However, the present disclosure is not limited thereto. In the case where the first and second compensation transistors T3_O and T3_E are N-type transistors, the odd compensation scan signal SC_Oj may have a positive voltage level during the active period and may have a negative voltage level during the inactive period. Also, in this case, the even compensation scan signal SC_Ej may have a negative voltage level during the first frame OF.

An active period of the odd compensation scan signal SC_Oj may not overlap an active period of the initialization scan signal SIj. The active period of the initialization scan signal SIj may come before the active period of the odd compensation scan signal SC_Oj. Also, the active period of the write scan signal SWj may overlap the active period of the odd compensation scan signal SC_Oj. Accordingly, the odd compensation period CP_O may overlap the write period WP and may not overlap the initialization period IP. The odd compensation period CP_O may come after the initialization period IP. According to some embodiments of the present disclosure, the duration of the active period of the odd compensation scan signal SC_Oj may be the same as the duration of the active period of the initialization scan signal SIj. For example, in the case where the active period of the odd compensation scan signal SC_Oj is 1H, the duration of the active period of the initialization scan signal SIj may also be 1H.

The first driving transistor T1_O is diode-connected by the first compensation transistor T3_O turned on during the odd compensation period CP_O of the first frame OF, so as to be forward-biased. Also, the data signal Di supplied through the switching transistor T2 turned on during the write period WP is applied to the first electrode of the first driving transistor T1_O. As such, a compensation voltage "Di-Vth" that is smaller than a voltage of the data signal Di as much as a threshold voltage Vth is applied to the first control electrode of the first driving transistor T1_O. That is, a potential of the first control electrode of the first driving transistor T1_O may be the compensation voltage "Di-Vth".

The first driving voltage ELVDD and the compensation voltage "Di-Vth" may be respectively applied to opposite ends of the first capacitor Cst1, and charges, the amount of which corresponds to a voltage difference of the opposite ends of the first capacitor Cst1, may be stored in the first capacitor Cst1.

During the odd compensation period CP_O of the first frame OF, because the second compensation transistor T3_E is in the turn-off state, the second control electrode of the second driving transistor T1_E may be held at the second initialization voltage VINT2. Accordingly, during the odd compensation period CP_O, the second driving transistor T1_E may maintain the turn-off state.

Meanwhile, when the third initialization transistor T7 is turned on in response to the black scan signal SBj, a portion of the driving current Id may be drained through the third initialization transistor T7 as a bypass current Ibp.

Assuming the case where the pixel PXij displays a black image in the first frame OF, in the case where the light emitting element ED emits a light even though a minimum driving current of the first driving transistor T1_O flows as the driving current Id, the pixel PXij fails to normally display the black image. Accordingly, the third initialization transistor T7 of the pixel PXij according to some embodiments of the present disclosure may drain (or distribute) a portion of the minimum driving current of the first driving transistor T1_O to a current path, which is different from a current path to the light emitting element ED, as the bypass current Ibp. Herein, the minimum driving current of the first driving transistor T1_O means a current flowing to the first driving transistor T1_O under the condition that a gate-source voltage Vgs of the first driving transistor T1_O is smaller than the threshold voltage Vth, that is, the first driving transistor T1_O is turned off. As the minimum driving current (e.g., a current of 10 pA or less) flowing to the first driving transistor T1_O is transferred to the light emitting element ED under the condition that the first driving transistor T1_O is turned off, an image of a black grayscale is displayed. In the case where the pixel PXij displays the black image, the bypass current Ibp has a relatively large influence on the minimum driving current; in contrast, in the case where the pixel PXij displays an image such as a normal image or a white image, there is little influence of the bypass current Ibp on the driving current Id. Accordingly, in the case of displaying the black image, a current (i.e., a light emitting current led) obtained by subtracting the bypass current Ibp flowing through the third initialization transistor T7 from the driving current Id may be provided to the light emitting element ED, and thus, the black image may be clearly displayed. Accordingly, the pixel PXij may implement an accurate black grayscale image by using the third initialization transistor T7, and thus, a contrast ratio may be improved.

Next, when the non-emission period NEP ends and the emission control signal EMj is activated, the first and second emission control transistors T5 and T6 are turned on by the emission control signal EMj thus activated. In this case, there is generated the driving current Id that follows a voltage difference between a potential of the first control electrode of the first driving transistor T1_O and the first driving voltage ELVDD; the driving current Id is supplied to the light emitting element ED through the second emission control transistor T6, and thus, the light emitting current led flows through the light emitting element ED.

Afterwards, when the first frame OF ends and the second frame EF starts, the first initialization voltage VINT1 changes from the first voltage level V1 to the second voltage level V2, and the second initialization voltage VINT2 changes from the second voltage level V2 to the first voltage level V1.

During the initialization period IP of the second frame EF, when the activated initialization scan signal Slj is provided to the initialization scan line SILj, the first and second initialization transistors T4_O and T4_E are simultaneously (or concurrently) turned on in response to the activated initialization scan signal Slj. The first initialization voltage VINT1 is transferred to the first control electrode of the first driving transistor T1_O through the turned-on first initialization transistor T4_O, and an off bias may be formed at the first driving transistor T1_O by the first initialization voltage VINT1. The second initialization voltage VINT2 is transferred to the second control electrode of the second driving transistor T1_E through the turned-on second initialization transistor T4_E, and the second control electrode of the second driving transistor T1_E is initialized by the second initialization voltage VINT2. According to some embodiments of the present disclosure, the first voltage level V1 may have a negative voltage level, and the second voltage level V2 may have a positive voltage level.

In the second frame EF, because the first initialization voltage VINT1 has the second voltage level V2, during the initialization period IP of the second frame EF, the first driving transistor T1_O may be maintained in the turn-off state, and the second control electrode of the second driving transistor T1_E may be initialized to the second initialization voltage VINT2 having the first voltage level V1. As such, even though the first and second initialization transistors T4_O and T4_E are simultaneously (or concurrently) turned on every frame, the first and second driving transistors T1_O and T1_E may be turned on alternately in units of frame by changing the voltage levels of the first and second initialization voltages VINT1 and VINT2 in units of one frame.

Next, during the write period WP of the second frame EF, when the activated write scan signal SWj is supplied to the write scan line SWLj, the switching transistor T2 is turned on.

During a compensation period CP_E of the second frame EF (i.e., capable of being called an "even compensation period" or a "second compensation period"), when the activated even compensation scan signal SC_Ej is supplied to the even compensation scan line SCL_Ej, the second compensation transistor T3_E is turned on. During the second frame EF, the odd compensation scan signal SC_Oj is maintained in the inactive state. Accordingly, during the compensation period CP_E of the second frame EF, the first compensation transistor T3_O may be maintained in the turn-off state.

In the case where the first and second compensation transistors T3_O and T3_E are P-type transistors, the even compensation scan signal SC_Ej may have a negative voltage level during the active period and may have a positive voltage level during the inactive period. Also, in this case, the odd compensation scan signal SC_Oj may have a positive voltage level during the second frame EF. However, the present disclosure is not limited thereto. In the case where the first and second compensation transistors T3_O and T3_E are N-type transistors, the odd compensation scan signal SC_Oj may have a positive voltage level during the active period and may have a negative voltage level during the inactive period. Also, in this case, the odd compensation scan signal SC_Oj may have a negative voltage level during the second frame EF.

The active period of the even compensation scan signal SC_Ej may not overlap the active period of the initialization scan signal Slj. The active period of the initialization scan signal Slj may come before the active period of the even compensation scan signal SC_Ej. Also, the active period of the write scan signal SWj may overlap the active period of the even compensation scan signal SC_Ej. Accordingly, the even compensation period CP_E may overlap the write period WP and may not overlap the initialization period IP. The even compensation period CP_E may come after the initialization period IP. According to some embodiments of the present disclosure, the duration of the active period of the even compensation scan signal SC_Ej may be the same as the duration of the active period of the initialization scan signal Slj. For example, in the case where the active period of the even compensation scan signal SC_Ej is 1H, the duration of the active period of the initialization scan signal Slj may also be 1H.

The second driving transistor T1_E is diode-connected by the second compensation transistor T3_E turned on during the even compensation period CP_E of the second frame EF, so as to be forward-biased. Also, the data signal Di supplied through the switching transistor T2 turned on during the write period WP is applied to the first electrode of the second driving transistor T1_E. As such, the compensation voltage "Di-Vth" that is smaller than a voltage of the data signal Di as much as the threshold voltage Vth is applied to the second control electrode of the second driving transistor T1_E. That is, a potential of the second control electrode of the second driving transistor T1_E may be the compensation voltage “Di-Vth”.

The first driving voltage ELVDD and the compensation voltage “Di-Vth” may be respectively applied to opposite ends of the second capacitor Cst2, and charges, the amount of which corresponds to a voltage difference of the opposite ends of the second capacitor Cst2, may be stored in the second capacitor Cst2.

During the even compensation period CP_E of the second frame EF, because the first compensation transistor T3_O is in the turn-off state, the first control electrode of the first driving transistor T1_O may be held at the first initialization voltage VINT1. Accordingly, during the even compensation period CP_E, the first driving transistor T1_O may maintain the turn-off state.

Next, when the non-emission period NEP ends and the emission control signal EMj is activated, the first and second emission control transistors T5 and T6 are turned on by the emission control signal EMj thus activated. In this case, there is generated the driving current Id that follows a voltage difference between a potential of the second control electrode of the second driving transistor T1_E and the first driving voltage ELVDD; the driving current Id is supplied to the light emitting element ED through the second emission control transistor T6, and thus, the light emitting current led flows through the light emitting element ED.

The case where the first and second driving transistors T1_O and T1_E operate alternately in units of one frame and the first and second compensation transistors T3_O and T3_E operate alternately in units of one frame is illustrated in FIGS. 4 and 5A as an example. However, the present disclosure is not limited thereto. For example, the first and second driving transistors T1_O and T1_E may operate alternately in units of two or more frames, and the first and second compensation transistors T3_O and T3_E may operate alternately in units of two or more frames.

Referring to FIGS. 4 and 5B, the display panel DP (refer to FIG. 3) may display an image during a plurality of frames. Four frames (i.e., first, second, third, and fourth frames F1, F2, F3, and F4) of a plurality of frames are illustrated in FIG. 5B. According to some embodiments of the present disclosure, the first and third frames F1 and F3 may be odd-numbered frames, and the second and fourth frames F2 and F4 may be even-numbered frames. Herein, the first and second frames F1 and F2 may be referred to as a “first compensation frame”, and the third and fourth frames F3 and F4 may be referred to as a “second compensation frame”.

The voltage level of the first initialization voltage VINT1 may vary in units of two frames, and the voltage level of the second initialization voltage VINT2 may vary in units of two frames. According to some embodiments of the present disclosure, the first initialization voltage VINT1 has the first voltage level V1 during the first and second frames F1 and F2 and has the second voltage level V2 during the third and fourth frames F3 and F4. The second initialization voltage VINT2 has the second voltage level V2 during the first and second frames F1 and F2 and has the first voltage level V1 during the third and fourth frames F3 and F4.

During the initialization period IP of the each of the first and second frames F1 and F2, operations of the first and second initialization transistors T4_O and T4_E are the same as the operations in the initialization period IP of the first frame OF illustrated in FIG. 5A. During the initialization period IP of each of the third and fourth frames F3 and F4, operations of the first and second initialization transistors T4_O and T4_E are the same as the operations in the initialization period IP of the second frame EF illustrated in FIG. 5A. Thus, additional description associated with the operations of the first and second initialization transistors T4_O and T4_E will be omitted to avoid redundancy.

During the odd compensation period CP_O of the each of the first and second frames F1 and F2, when the activated odd compensation scan signal SC_Oj is supplied to the odd compensation scan line SCL_Oj, the first compensation transistor T3_O is turned on. During the first and second frames F1 and F2, the even compensation scan signal SC_Ej is maintained in the inactive state. Accordingly, during the first and second frames F1 and F2, the second compensation transistor T3_E may be maintained in the turn-off state.

The first driving transistor T1_O is diode-connected by the first compensation transistor T3_O turned on during the odd compensation period CP_O of the each of the first and second frames F1 and F2, so as to be forward-biased. Also, the data signal Di supplied through the switching transistor T2 turned on during the write period WP is applied to the first electrode of the first driving transistor T1_O. As such, the compensation voltage “Di-Vth” that is smaller than a voltage of the data signal Di as much as the threshold voltage Vth is applied to the first control electrode of the first driving transistor T1_O. That is, a potential of the first control electrode of the first driving transistor T1_O may be the compensation voltage “Di-Vth”.

The first driving voltage ELVDD and the compensation voltage “Di-Vth” may be respectively applied to the opposite ends of the first capacitor Cst1, and charges, the amount of which corresponds to a voltage difference of the opposite ends of the first capacitor Cst1, may be stored in the first capacitor Cst1.

During the odd compensation period CP_O of the each of the first and second frames F1 and F2, because the second compensation transistor T3_E is in the turn-off state, the second control electrode of the second driving transistor T1_E may be held at the second initialization voltage VINT2. Accordingly, during the odd compensation period CP_O, the second driving transistor T1_E may maintain the turn-off state.

Next, when the non-emission period NEP of the each of the first and second frames F1 and F2 ends and the emission control signal EMj is activated, the first and second emission control transistors T5 and T6 are turned on by the emission control signal EMj thus activated. In this case, there is generated the driving current Id that follows a voltage difference between a potential of the first control electrode of the first driving transistor T1_O and the first driving voltage ELVDD; the driving current Id is supplied to the light emitting element ED through the second emission control transistor T6, and thus, the light emitting current led flows through the light emitting element ED.

During the even compensation period CP_E of each of the third and fourth frames F3 and F4, when the activated even compensation scan signal SC_Ej is supplied to the even compensation scan line SCL_Ej, the second compensation transistor T3_E is turned on. During the third and fourth frames F3 and F4, the odd compensation scan signal SC_Oj is maintained in the inactive state. Accordingly, during the third and fourth frames F3 and F4, the first compensation transistor T3_O may be maintained in the turn-off state.

The second driving transistor T1_E is diode-connected by the second compensation transistor T3_E turned on during the even compensation period CP_E of each of the third and fourth frames F3 and F4, so as to be forward-biased. Also, the data signal Di supplied through the switching transistor T2 turned on during the write period WP is applied to the first electrode of the second driving transistor T1_E. As such, the compensation voltage "Di-Vth" that is smaller than a voltage of the data signal Di as much as the threshold voltage Vth is applied to the second control electrode of the second driving transistor T1_E. That is, a potential of the second control electrode of the second driving transistor T1_E may be the compensation voltage "Di-Vth".

The first driving voltage ELVDD and the compensation voltage "Di-Vth" may be respectively applied to the opposite ends of the second capacitor Cst2, and charges, the amount of which corresponds to a voltage difference of the opposite ends of the second capacitor Cst2, may be stored in the second capacitor Cst2.

During the even compensation period CP_E of each of the third and fourth frames F3 and F4, because the first compensation transistor T3_O is in the turn-off state, the first control electrode of the first driving transistor T1_O may be held at the first initialization voltage VINT1. Accordingly, during the even compensation period CP_E, the first driving transistor T1_O may maintain the turn-off state.

Next, when the non-emission period NEP of each of the third and fourth frames F3 and F4 ends and the emission control signal EMj is activated, the first and second emission control transistors T5 and T6 are turned on by the emission control signal EMj thus activated. In this case, there is generated the driving current Id that follows a voltage difference between a potential of the second control electrode of the second driving transistor T1_E and the first driving voltage ELVDD; the driving current Id is supplied to the light emitting element ED through the second emission control transistor T6, and thus, the light emitting current led flows through the light emitting element ED.

As each of the first and second driving transistors T1_O and T1_E operates alternately in units of at least one frame, a hysteresis characteristic that occurs when the first and second driving transistors T1_O and T1_E operate every frame may be suppressed. As a result, a phenomenon that an after-image is displayed in the display device DD may be prevented. This may mean that the overall display quality of the display device DD is improved.

Figure 6:
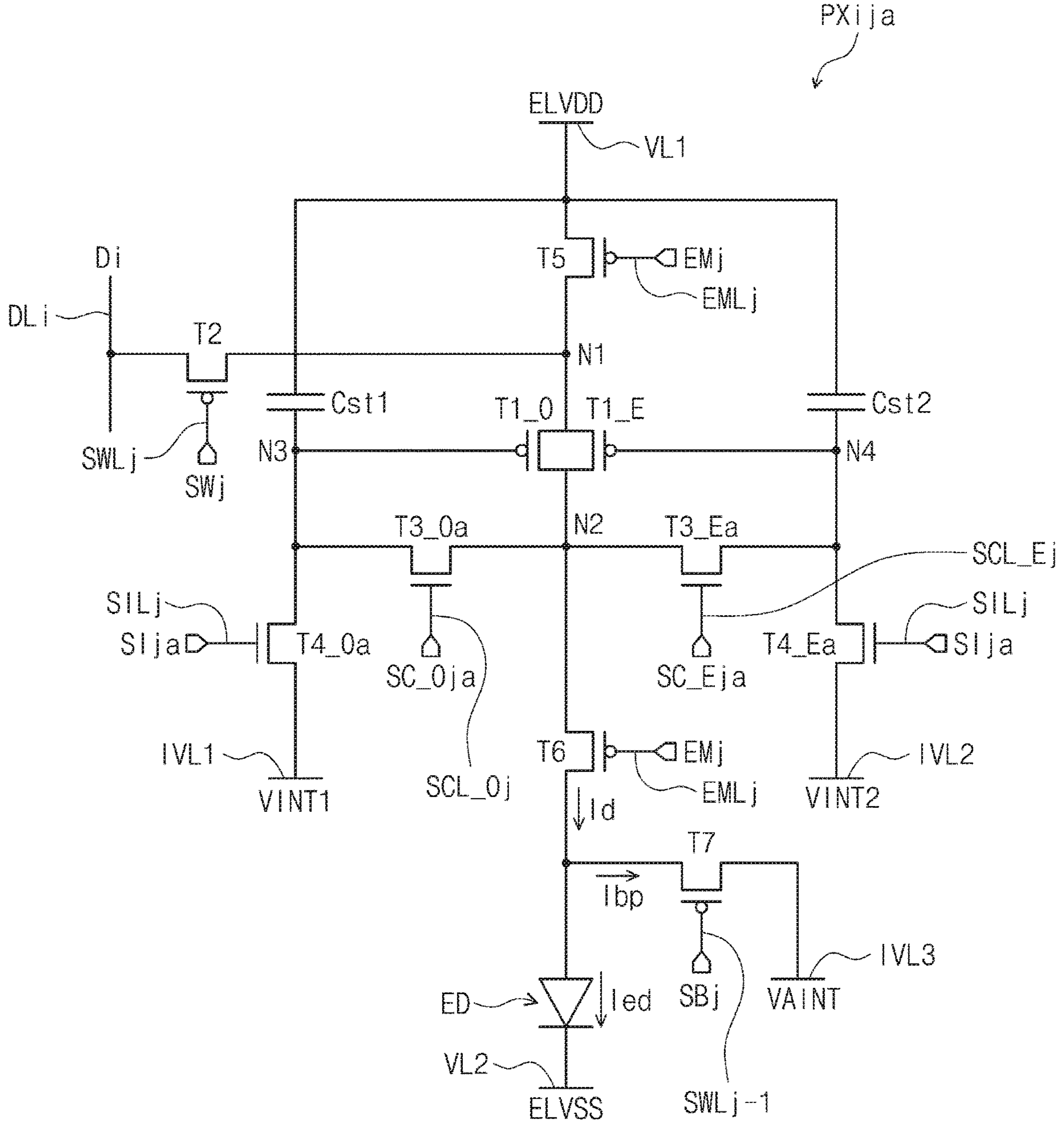
FIG. 6 is a circuit diagram of a pixel according to some embodiments of the present disclosure.
Figure 7A:
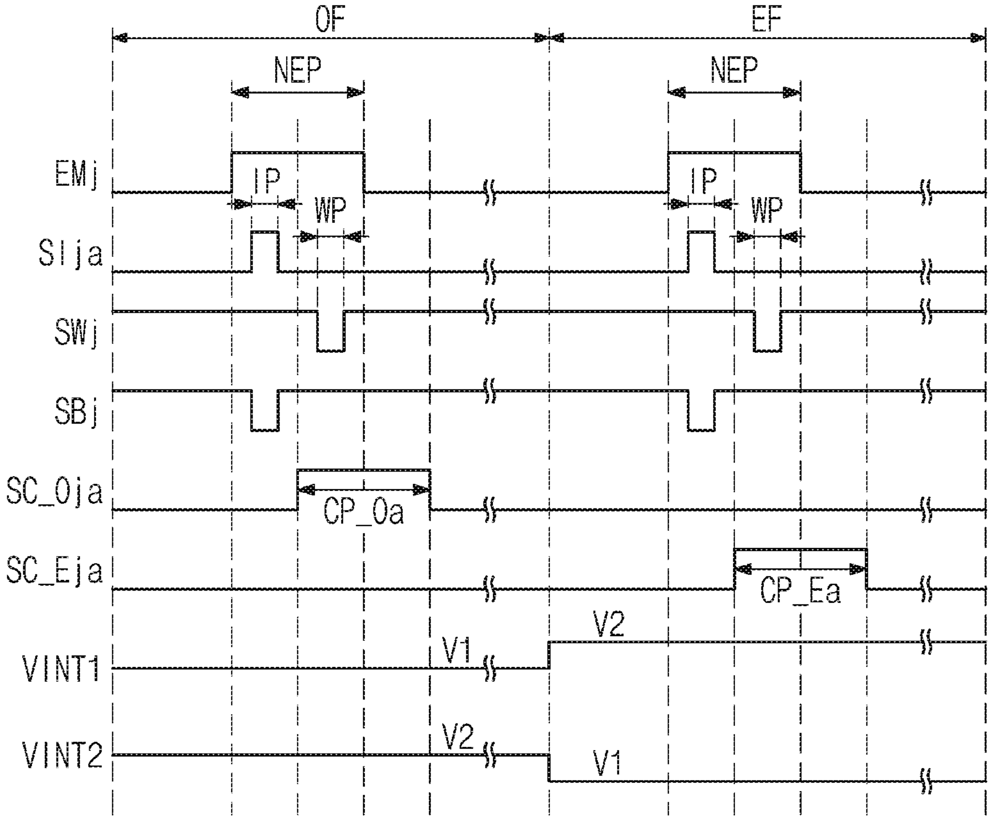
FIG. 7A is a timing diagram for describing an operation of a pixel illustrated in FIG. 6, according to some embodiments of the present disclosure.
Figure 7B:
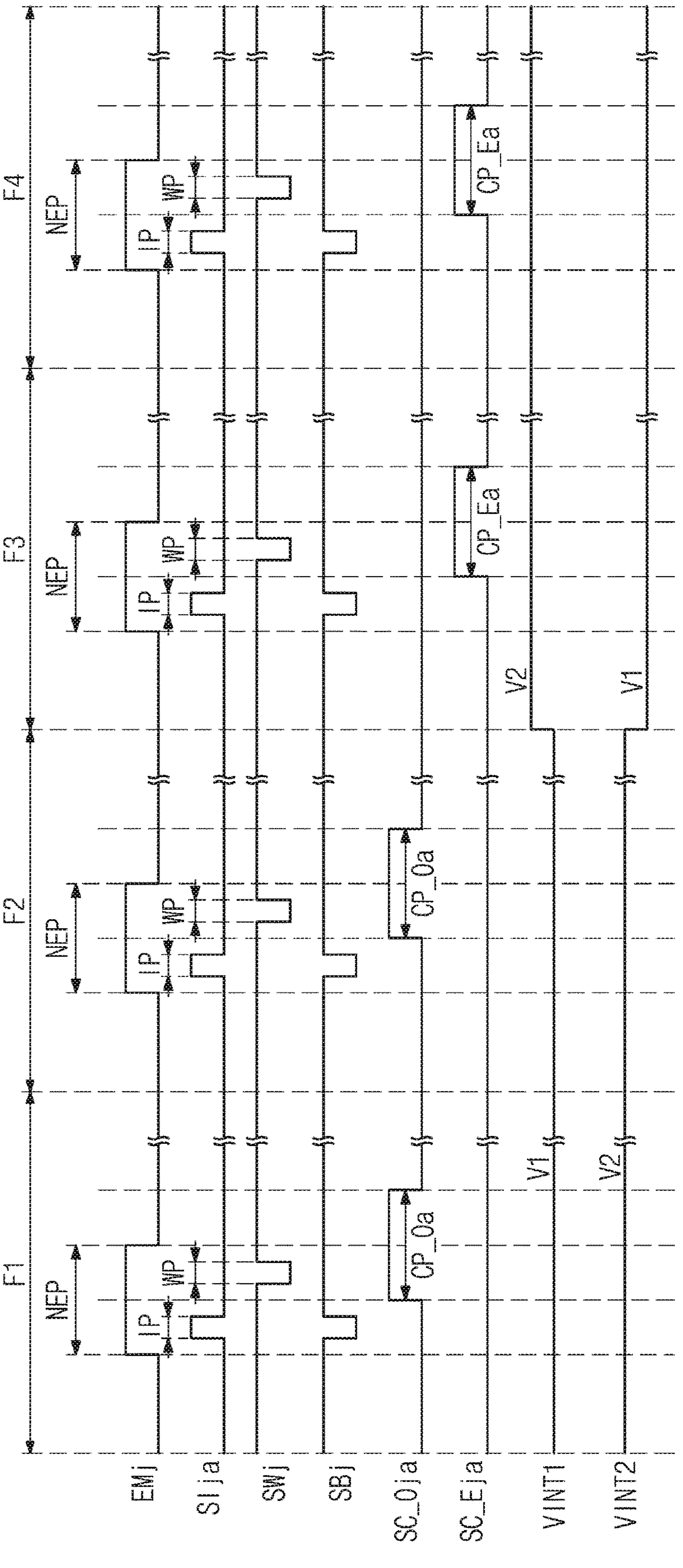
FIG. 7B is a timing diagram for describing an operation of a pixel illustrated in FIG. 6, according to some embodiments of the present disclosure.

FIG. 6 is a circuit diagram of a pixel according to some embodiments of the present disclosure. FIG. 7A is a timing diagram for describing an operation of a pixel illustrated in FIG. 6, according to some embodiments of the present disclosure. FIG. 7B is a timing diagram for describing an operation of a pixel illustrated in FIG. 6, according to some embodiments of the present disclosure. Components, which are the same as the components illustrated in FIG. 4, from among components illustrated in FIG. 6 are marked by the same reference signs, and thus, additional description will be omitted to avoid redundancy.

Referring to FIG. 6, a pixel PXija includes the light emitting element ED and the pixel circuit unit. The light emitting element ED may be a light emitting diode.

The pixel circuit unit includes the first and second driving transistors T1_O and T1_E, the switching transistor T2, first and second compensation transistors T3_Oa and T3_Ea, and first and second initialization transistors T4_Oa and T4_Ea. The pixel circuit unit further includes the first and second capacitors Cst1 and Cst2, the first and second emission control transistors T5 and T6, and the third initialization transistor T7.

Each of the first and second driving transistors T1_O and T1_E, the switching transistor T2, the first and second emission control transistors T5 and T6, and the third initialization transistor T7 may be a transistor having a low-temperature polycrystalline silicon (LTPS) semiconductor layer. All of the first and second driving transistors T1_O and T1_E, the switching transistor T2, the first and second emission control transistors T5 and T6, and the third initialization transistor T7 may be P-type transistors.

Each of the first and second compensation transistors T3_Oa and T3_Ea and the first and second initialization transistors T4_Oa and T4_Ea may be a transistor having an oxide semiconductor layer. All of the first and second compensation transistors T3_Oa and T3_Ea and the first and second initialization transistors T4_Oa and T4_Ea may be N-type transistors. However, the configuration of the pixel circuit unit according to embodiments of the present disclosure is not limited to the embodiments illustrated in FIG. 6. The pixel circuit unit illustrated in FIG. 6 is only an example. For example, the configuration of the pixel circuit unit may be modified and implemented.

The initialization scan line SILj may transfer a j-th initialization scan signal (hereinafter referred to as an "initialization scan signal") SIja received from the scan driver 300 (refer to FIG. 3) to the pixel PXija. The odd compensation scan line SCL_Oj may transfer a j-th odd compensation scan signal (hereinafter referred to as an "odd compensation scan signal") SC_Oja received from the scan driver 300 to the pixel PXija, and the even compensation scan line SCL_Ej may transfer a j-th even compensation scan signal (hereinafter referred to as an "even compensation scan signal") SC_Eja received from the scan driver 300 to the pixel PXija.

A connection structure of the first and second compensation transistors T3_Oa and T3_Ea and the first and second initialization transistors T4_Oa and T4_Ea illustrated in FIG. 6 is the same as the connection structure of the first and second compensation transistors T3_O and T3_E and the first and second initialization transistors T4_O and T4_E illustrated in FIG. 4. Thus, additional description associated with the connection structure of the first and second compensation transistors T3_Oa and T3_Ea and the first and second initialization transistors T4_Oa and T4_Ea will be omitted to avoid redundancy.

Referring to FIGS. 6 and 7A, each of the first and second frames OF and EF includes the inactive period (i.e., capable of being called a "non-emission period") of the emission control signal EMj. In the first frame OF, the initialization scan signal SIja, the write scan signal SWj, the black scan signal SBj, and the odd compensation scan signal SC_Oja may be activated during a portion of the non-emission period NEP.

During the initialization period IP of the first frame OF, when the activated initialization scan signal SIja is provided to the initialization scan line SILj, the first and second initialization transistors T4_Oa and T4_Ea are simultaneously (or concurrently) turned on in response to the activated initialization scan signal SIja. The first initialization voltage VINT1 is transferred to the first control electrode of the first driving transistor T1_O through the turned-on first initialization transistor T4_Oa, and the first control electrode of the first driving transistor T1_O is initialized by the first initialization voltage VINT1. The second initialization voltage VINT2 is transferred to the second control electrode of the second driving transistor T1_E through the turned-on second initialization transistor T4_Ea, and an off bias may be formed at the second driving transistor T1_E by the second initialization voltage VINT2.

According to some embodiments of the present disclosure, the first and second initialization transistors T4_Oa and T4_Ea may be N-type transistors, and the initialization scan signal SIja may have a positive voltage level during the active period and may have a negative voltage level during the inactive period.

During a compensation period CP_Oa of the first frame OF (i.e., capable of being called an "odd compensation period" or a "first compensation period"), when the activated odd compensation scan signal SC_Oja is supplied to the odd compensation scan line SCL_Oj, the first compensation transistor T3_Oa is turned on. During the first frame OF, the even compensation scan signal SC_Eja is maintained in the inactive state. Accordingly, during the first frame OF, the second compensation transistor T3_Ea may be maintained in the turn-off state.

Because the first compensation transistor T3_Oa is an N-type transistor, the odd compensation scan signal SC_Oja may have a positive voltage level during the active period and may have a negative voltage level during the inactive period. Also, in this case, the even compensation scan signal SC_Eja may have a negative voltage level during the first frame OF.

The active period of the odd compensation scan signal SC_Oja may not overlap the active period of the initialization scan signal SIja. The active period of the initialization scan signal SIja may come before the active period of the odd compensation scan signal SC_Oja. Also, the active period of the write scan signal SWj may overlap the active period of the odd compensation scan signal SC_Oja. Accordingly, the odd compensation period CP_Oa may overlap the write period WP and may not overlap the initialization period IP. The odd compensation period CP_Oa may come after the initialization period IP. According to some embodiments of the present disclosure, the duration of the active period of the odd compensation scan signal SC_Oja may be different from the duration of the active period of the initialization scan signal SIja. For example, the duration of the active period of the odd compensation scan signal SC_Oja may be greater than the duration of the active period of the initialization scan signal SIja as much as two times or more.

The first driving transistor T1_O is diode-connected by the first compensation transistor T3_Oa turned on during the odd compensation period CP_Oa of the first frame OF, so as to be forward-biased. Also, the data signal Di supplied through the switching transistor T2 turned on during the write period WP is applied to the first electrode of the first driving transistor T1_O. As such, the compensation voltage "Di-Vth" that is smaller than a voltage of the data signal Di as much as the threshold voltage Vth is applied to the first control electrode of the first driving transistor T1_O. That is, a potential of the first control electrode of the first driving transistor T1_O may be the compensation voltage "Di-Vth".

The first driving voltage ELVDD and the compensation voltage "Di-Vth" may be respectively applied to the opposite ends of the first capacitor Cst1, and charges, the amount of which corresponds to a voltage difference of the opposite ends of the first capacitor Cst1, may be stored in the first capacitor Cst1.

During the odd compensation period CP_Oa of the first frame OF, because the second compensation transistor T3_Ea is in the turn-off state, the second control electrode of the second driving transistor T1_E may be held at the second initialization voltage VINT2. Accordingly, during the odd compensation period CP_Oa, the second driving transistor T1_E may maintain the turn-off state.

Afterwards, when the first frame OF ends and the second frame EF starts, the first initialization voltage VINT1 changes from the first voltage level V1 to the second voltage level V2, and the second initialization voltage VINT2 changes from the second voltage level V2 to the first voltage level V1.

During the initialization period IP of the second frame EF, when the activated initialization scan signal SIja is provided to the initialization scan line SILj, the first and second initialization transistors T4_Oa and T4_Ea are simultaneously (or concurrently) turned on in response to the activated initialization scan signal SIja. The first initialization voltage VINT1 is transferred to the first control electrode of the first driving transistor T1_O through the turned-on first initialization transistor T4_Oa, and an off bias may be formed at the first driving transistor T1_O by the first initialization voltage VINT1. The second initialization voltage VINT2 is transferred to the second control electrode of the second driving transistor T1_E through the turned-on second initialization transistor T4_Ea, and the second control electrode of the second driving transistor T1_E is initialized by the second initialization voltage VINT2. According to some embodiments of the present disclosure, the first voltage level V1 may have a negative voltage level, and the second voltage level V2 may have a positive voltage level.

In the second frame EF, because the first initialization voltage VINT1 has the second voltage level V2, an off bias voltage may be applied to the first driving transistor T1_O, and the second driving transistor T1_E may be initialized to the second initialization voltage VINT2 having the first voltage level V1. As such, even though the first and second initialization transistors T4_Oa and T4_Ea are simultaneously (or concurrently) turned on every frame, the first and second driving transistors T1_O and T1_E may be turned on alternately in units of frame by changing the voltage levels of the first and second initialization voltages VINT1 and VINT2 in units of one frame.

Next, during a compensation period CP_Ea of the second frame EF (i.e., capable of being called an "even compensation period" or a "second compensation period"), when the activated even compensation scan signal SC_Eja is supplied to the even compensation scan line SCL_Ej, the second compensation transistor T3_Ea is turned on. During the second frame EF, the odd compensation scan signal SC_Oja is maintained in the inactive state. Accordingly, during the second frame EF, the first compensation transistor T3_Oa may be maintained in the turn-off state.

Because the second compensation transistor T3_Ea is an N-type transistor, the even compensation scan signal SC_Eja may have a positive voltage level during the active period and may have a negative voltage level during the inactive period. Also, in this case, the odd compensation scan signal SC_Oja may have a negative voltage level during the second frame EF.

The active period of the even compensation scan signal SC_Eja may not overlap the active period of the initialization scan signal SIja. The active period of the initialization scan signal SIja may come before the active period of the even compensation scan signal SC_Eja. Also, the active period of the write scan signal SWj may overlap the active period of the even compensation scan signal SC_Eja. Accordingly, the even compensation period CP_Ea may overlap the write period WP and may not overlap the initialization period IP. The even compensation period CP_Ea may come after the initialization period IP. According to some embodiments of the present disclosure, the duration of the active period of the even compensation scan signal SC_Eja may be different from the duration of the active period of the initialization scan signal SIja. For example, the duration of the active period of the even compensation scan signal SC_Eja may be greater than the duration of the active period of the initialization scan signal SIja as much as two times or more.

The second driving transistor T1_E is diode-connected by the second compensation transistor T3_Ea turned on during the even compensation period CP_Ea of the second frame EF, so as to be forward-biased. Also, the data signal Di supplied through the switching transistor T2 turned on during the write period WP is applied to the first electrode of the second driving transistor T1_E. As such, the compensation voltage "Di-Vth" that is smaller than a voltage of the data signal Di as much as the threshold voltage Vth is applied to the second control electrode of the second driving transistor T1_E. That is, a potential of the second control electrode of the second driving transistor T1_E may be the compensation voltage "Di-Vth".

The first driving voltage ELVDD and the compensation voltage "Di-Vth" may be respectively applied to the opposite ends of the second capacitor Cst2, and charges, the amount of which corresponds to a voltage difference of the opposite ends of the second capacitor Cst2, may be stored in the second capacitor Cst2.

During the even compensation period CP_Ea of the second frame EF, because the first compensation transistor T3_Oa is in the turn-off state, the first control electrode of the first driving transistor T1_O may be held at the first initialization voltage VINT1. Accordingly, during the even compensation period CP_Ea, the first driving transistor T1_O may maintain the turn-off state.

The case where the first and second driving transistors T1_O and T1_E operate alternately in units of one frame and the first and second compensation transistors T3_Oa and T3_Ea operate alternately in units of one frame is illustrated in FIGS. 6 and 7A as an example. However, the present disclosure is not limited thereto. For example, the first and second driving transistors T1_O and T1_E may operate alternately in units of two or more frames, and the first and second compensation transistors T3_Oa and T3_Ea may operate alternately in units of two or more frames.

Referring to FIGS. 6 and 7B, the display panel DP (refer to FIG. 3) may display an image during a plurality of frames. Four frames (i.e., the first, second, third, and fourth frames F1, F2, F3, and F4) of a plurality of frames are illustrated in FIG. 7B. According to some embodiments of the present disclosure, the first and third frames F1 and F3 may be odd-numbered frames, and the second and fourth frames F2 and F4 may be even-numbered frames. Herein, the first and second frames F1 and F2 may be referred to as a "first compensation frame", and the third and fourth frames F3 and F4 may be referred to as a "second compensation frame".

The voltage level of the first initialization voltage VINT1 may vary in units of two frames, and the voltage level of the second initialization voltage VINT2 may vary in units of two frames. According to some embodiments of the present disclosure, the first initialization voltage VINT1 has the first voltage level V1 during the first and second frames F1 and F2 and has the second voltage level V2 during the third and fourth frames F3 and F4. The second initialization voltage VINT2 has the second voltage level V2 during the first and second frames F1 and F2 and has the first voltage level V1 during the third and fourth frames F3 and F4.

During the initialization period IP of the each of the first and second frames F1 and F2, operations of the first and second initialization transistors T4_Oa and T4_Ea are the same as the operations in the initialization period IP of the first frame OF illustrated in FIG. 7A. During the initialization period IP of each of the third and fourth frames F3 and F4, operations of the first and second initialization transistors T4_Oa and T4_Ea are the same as the operations in the initialization period IP of the second frame EF illustrated in FIG. 7A. Thus, additional description associated with the operations of the first and second initialization transistors T4_Oa and T4_Ea will be omitted to avoid redundancy.

During the odd compensation period CP_Oa of the each of the first and second frames F1 and F2, when the activated odd compensation scan signal SC_Oja is supplied to the odd compensation scan line SCL_Oj, the first compensation transistor T3_Oa is turned on. During the first and second frames F1 and F2, the even compensation scan signal SC_Eja is maintained in the inactive state. Accordingly, during the first and second frames F1 and F2, the second compensation transistor T3_Ea may be maintained in the turn-off state.

The first driving transistor T1_O is diode-connected by the first compensation transistor T3_Oa turned on during the odd compensation period CP_Oa of the each of the first and second frames F1 and F2, so as to be forward-biased. Also, the data signal Di supplied through the switching transistor T2 turned on during the write period WP is applied to the first electrode of the first driving transistor T1_O. As such, the compensation voltage "Di-Vth" that is smaller than a voltage of the data signal Di as much as the threshold voltage Vth is applied to the first control electrode of the first driving transistor T1_O. That is, a potential of the first control electrode of the first driving transistor T1_O may be the compensation voltage "Di-Vth".

During the odd compensation period CP_Oa of the each of the first and second frames F1 and F2, because the second compensation transistor T3_Ea is in the turn-off state, the second control electrode of the second driving transistor T1_E may be held at the second initialization voltage VINT2. Accordingly, during the odd compensation period CP_Oa, the second driving transistor T1_E may maintain the turn-off state.

During the even compensation period CP_Ea of each of the third and fourth frames F3 and F4, when the activated even compensation scan signal SC_Eja is supplied to the even compensation scan line SCL_Ej, the second compensation transistor T3_Ea is turned on. During the third and fourth frames F3 and F4, the odd compensation scan signal SC_Oja is maintained in the inactive state. Accordingly, during the third and fourth frames F3 and F4, the first compensation transistor T3_Oa may be maintained in the turn-off state.

The second driving transistor T1_E is diode-connected by the second compensation transistor T3_Ea turned on during the even compensation period CP_Ea of each of the third and fourth frames F3 and F4, so as to be forward-biased. Also, the data signal Di supplied through the switching transistor T2 turned on during the write period WP is applied to the first electrode of the second driving transistor T1_E. As such, the compensation voltage "Di-Vth" that is smaller than a voltage of the data signal Di as much as the threshold voltage Vth is applied to the second control electrode of the second driving transistor T1_E. That is, a potential of the second control electrode of the second driving transistor T1_E may be the compensation voltage "Di-Vth".

During the even compensation period CP_Ea of each of the third and fourth frames F3 and F4, because the first compensation transistor T3_Oa is in the turn-off state, the first control electrode of the first driving transistor T1_O may be held at the first initialization voltage VINT1.

Accordingly, during the even compensation period CP_Ea, the first driving transistor T1_O may maintain the turn-off state.

As each of the first and second driving transistors T1_O and T1_E operates alternately in units of at least one frame, a hysteresis characteristic that occurs when the first and second driving transistors T1_O and T1_E operate every frame may be suppressed. As a result, a phenomenon that an after-image is displayed in the display device DD may be prevented or reduced. This may mean that the overall display quality of the display device DD is improved.

Figure 8:
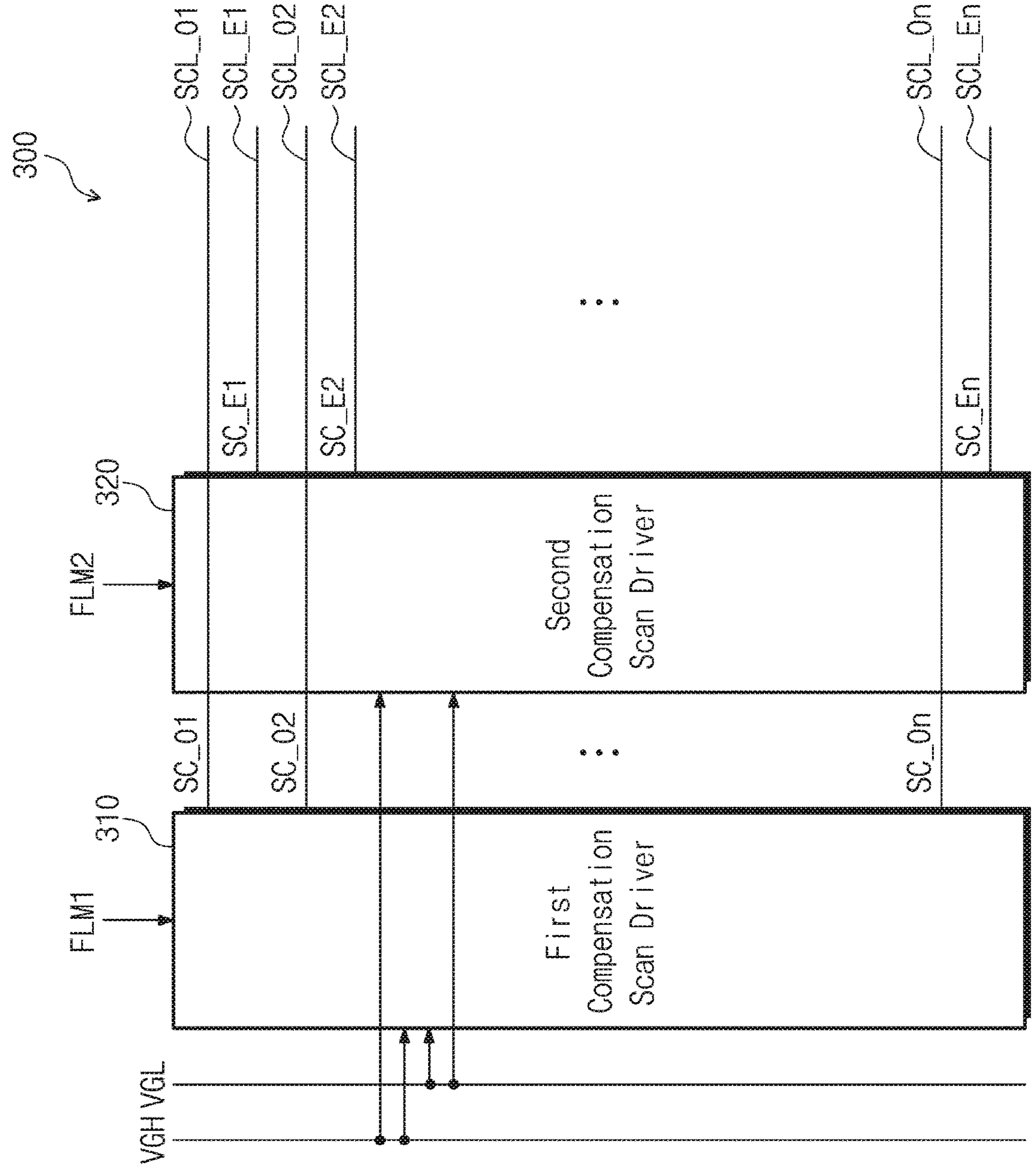
FIG. 8 is a block diagram of a scan driver according to some embodiments of the present disclosure.

FIG. 8 is a block diagram of a scan driver according to some embodiments of the present disclosure.

Referring to FIG. 8, the scan driver 300 according to some embodiments of the present disclosure may include a first compensation scan driver 310 and a second compensation scan driver 320.

The first compensation scan driver 310 is electrically connected with odd compensation scan lines SCL_O1 to SCL_On and outputs odd compensation scan signals SC_O1 to SC_On to the odd compensation scan lines SCL_O1 to SCL_On. The first compensation scan driver 310 may receive a first start signal FLM1 from the driving controller 100 (refer to FIG. 3).

According to some embodiments as illustrated in FIGS. 5A and 7A, the first start signal FLM1 may be activated in the first frame OF and may be deactivated in the second frame EF. Accordingly, the first compensation scan driver 310 may be activated during the first frame OF and may be maintained in the inactive state during the second frame EF. The odd compensation scan signals SC_O1 to SC_On may be sequentially activated during the first frame OF and may be maintained in the inactive state during the second frame EF.

According to some embodiments as illustrated in FIGS. 5B and 7B, the first start signal FLM1 may be activated in the first and second frames F1 and F2 and may be deactivated in the third and fourth frames F3 and F4. Accordingly, the first compensation scan driver 310 may be activated during the first and second frames F1 and F2 and may be maintained in the inactive state during the third and fourth frames F3 and F4.

The second compensation scan driver 320 is electrically connected with even compensation scan lines SCL_E1 to SCL_En and outputs even compensation scan signals SC_E1 to SC_En to the even compensation scan lines SCL_E1 to SCL_En. The second compensation scan driver 320 may receive a second start signal FLM2 from the driving controller 100.

According to some embodiments as illustrated in FIGS. 5A and 7A, the second start signal FLM2 may be activated in the second frame EF and may be deactivated in the first frame OF. Accordingly, the second compensation scan driver 320 may be activated during the second frame EF and may be maintained in the inactive state during the first frame OF. The even compensation scan signals SC_E1 to SC_En may be sequentially activated during the second frame EF and may be maintained in the inactive state during the first frame OF.

According to some embodiments as illustrated in FIGS. 5B and 7B, the second start signal FLM2 may be activated in the third and fourth frames F3 and F4 and may be deactivated in the first and second frames F1 and F2. Accordingly, the second compensation scan driver 320 may be activated during the third and fourth frames F3 and F4 and may be maintained in the inactive state during the first and second frames F1 and F2.

As such, the first and second compensation scan drivers 310 and 320 may be activated alternately in units of at least one frame.

Each of the first and second compensation scan drivers 310 and 320 may further receive a first voltage VGH and a second voltage VGL. The first and second voltages VGH and VGL may be provided from the voltage generator 400 illustrated in FIG. 3. The first voltage VGH and the second voltage VGL may determine a voltage level of the odd compensation scan signals SC_O1 to SC_On, and a voltage level of the even compensation scan signals SC_E1 to SC_En. For example, each of the odd compensation scan signals SC_O1 to SC_On and the even compensation scan signals SC_E1 to SC_En may have a voltage level corresponding to the second voltage VGL during the active period and may have a voltage level corresponding to the first voltage VGH during the inactive period.

Figure 9:
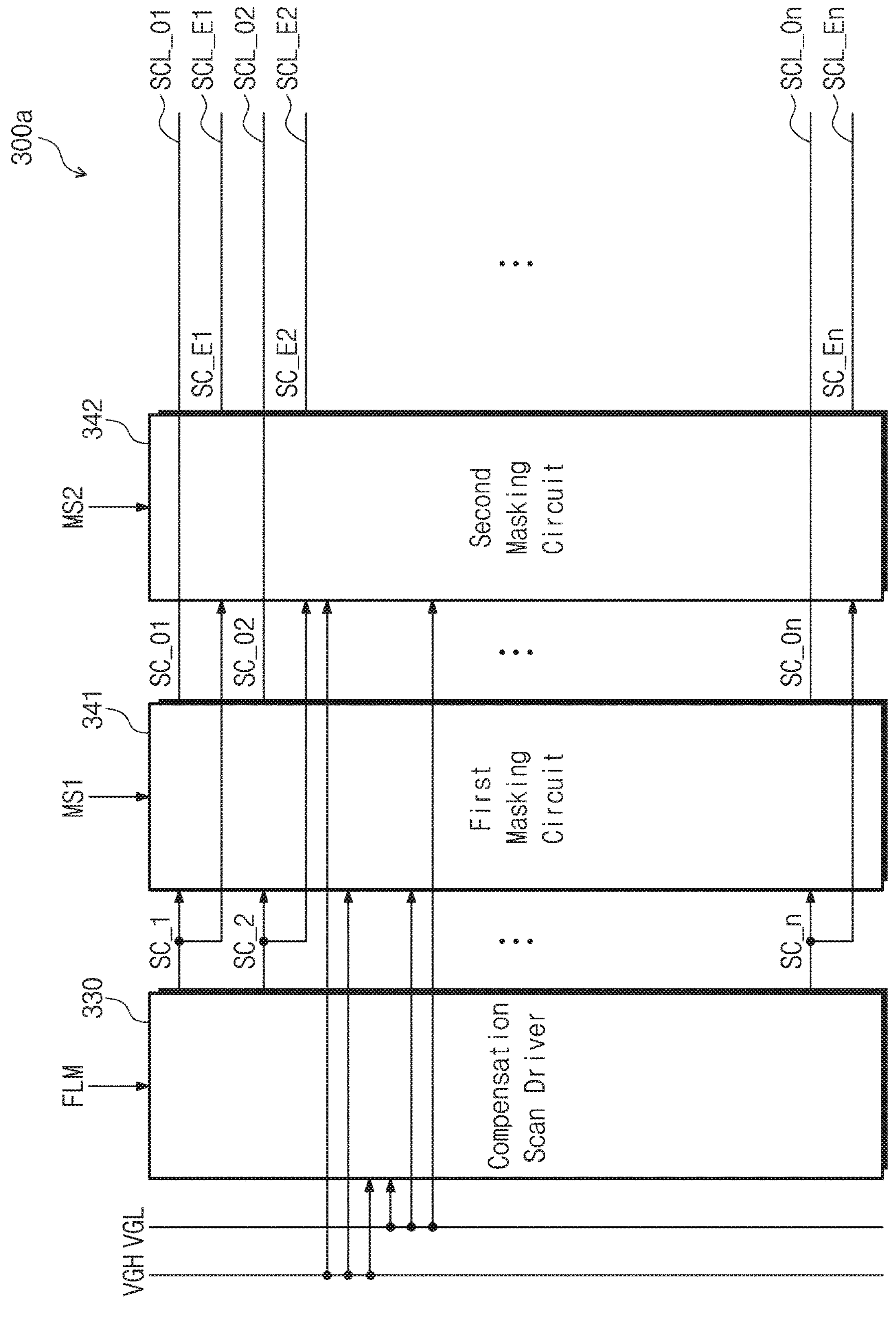
FIG. 9 is a block diagram of a scan driver according to some embodiments of the present disclosure.

FIG. 9 is a block diagram of a scan driver according to some embodiments of the present disclosure.

Referring to FIG. 9, a scan driver 300*a* according to some embodiments of the present disclosure may include a compensation scan driver 330, a first masking circuit 341 and a second masking circuit 342.

The compensation scan driver 330 may output the compensation scan signals SC_1 to SC_n every frame. The compensation scan signals SC_1 to SC_n thus output may be provided to the first masking circuit 341 and the second masking circuit 342. The compensation scan driver 330 may receive a start signal FLM from the driving controller 100 (refer to FIG. 3). The start signal FLM may be activated in units of frame.

The first masking circuit 341 may be electrically connected with the odd compensation scan lines SCL_O1 to SCL_On and may receive a first masking signal MS1 from the driving controller 100. The first masking circuit 341 may switch the output of the compensation scan signals SC_1 to SC_n in response to the first masking signal MS1. When the first masking signal MS1 is activated, the first masking circuit 341 may transfer the compensation scan signals SC_1 to SC_n to the odd compensation scan lines SCL_O1 to SCL_On; when the first masking signal MS1 is deactivated, the first masking circuit 341 may not transfer the compensation scan signals SC_1 to SC_n to the odd compensation scan lines SCL_O1 to SCL_On. Herein, the compensation scan signals SC_1 to SC_n selectively transferred by the first masking circuit 341 may be referred to as "odd compensation scan signals SC_O1 to SC_On".

The second masking circuit 342 may be electrically connected with the even compensation scan lines SCL_E1 to SCL_En and may receive a second masking signal MS2 from the driving controller 100. The second masking circuit 342 may switch the output of the compensation scan signals SC_1 to SC_n in response to the second masking signal MS2. When the second masking signal MS2 is activated, the second masking circuit 342 may transfer the compensation scan signals SC_1 to SC_n to the even compensation scan lines SCL_E1 to SCL_En; when the second masking signal MS2 is deactivated, the second masking circuit 342 may not transfer the compensation scan signals SC_1 to SC_n to the even compensation scan lines SCL_E1 to SCL_En. Herein, the compensation scan signals SC_1 to SC_n selectively transferred by the second masking circuit 342 may be referred to as "even compensation scan signals SC_E1 to SC_En".

Each of the first and second masking circuits 341 and 342 may further receive the first voltage VGH and the second voltage VGL.

In the embodiments illustrated with respect to FIGS. 5A and 7A, the first masking signal MS1 may be activated in the first frame OF and may be deactivated in the second frame EF. Accordingly, the first masking circuit 341 may transfer the compensation scan signals SC_1 to SC_n to the odd compensation scan lines SCL_O1 to SCL_On during the first frame OF and may not transfer the compensation scan signals SC_1 to SC_n to the odd compensation scan lines SCL_O1 to SCL_On during the second frame EF. That is, during the second frame EF, the first masking circuit 341 may output the first voltage VGH or the second voltage VGL to the odd compensation scan lines SCL_O1 to SCL_On instead of the compensation scan signals SC_1 to SC_n. As illustrated in FIG. 5A, in the case where the first compensation transistor T3_O is a P-type transistor, the first masking circuit 341 may output the first voltage VGH to the odd compensation scan lines SCL_O1 to SCL_On during the second frame EF. As illustrated in FIG. 7A, in the case where the first compensation transistor T3_Oa is an N-type transistor, the first masking circuit 341 may output the second voltage VGL to the odd compensation scan lines SCL_O1 to SCL_On during the second frame EF.

In contrast, the second masking signal MS2 may be activated in the second frame EF and may be deactivated in the first frame OF. Accordingly, the second masking circuit 342 may transfer the compensation scan signals SC_1 to SC_n to the even compensation scan lines SCL_E1 to SCL_En during the second frame EF and may not transfer the compensation scan signals SC_1 to SC_n to the even compensation scan lines SCL_E1 to SCL_En during the first frame OF. That is, during the first frame OF, the second masking circuit 342 may output the first voltage VGH or the second voltage VGL to the even compensation scan lines SCL_E1 to SCL_En instead of the compensation scan signals SC_1 to SC_n. As illustrated in FIG. 5A, in the case where the second compensation transistor T3_E is a P-type transistor, the second masking circuit 342 may output the first voltage VGH to the even compensation scan lines SCL_E1 to SCL_En during the first frame OF. As illustrated in FIG. 7A, in the case where the second compensation transistor T3_Ea is an N-type transistor, the second masking circuit 342 may output the second voltage VGL to the even compensation scan lines SCL_E1 to SCL_En during the first frame OF.

In the embodiments described with respect to FIGS. 5B and 7B, the first masking signal MS1 may be activated in the first and second frames F1 and F2 and may be deactivated in the third and fourth frames F3 and F4. Accordingly, the first masking circuit 341 may transfer the compensation scan signals SC_1 to SC_n to the odd compensation scan lines SCL_O1 to SCL_On during the first and second frames F1 and F2 and may not transfer the compensation scan signals SC_1 to SC_n to the odd compensation scan lines SCL_O1 to SCL_On during the third and fourth frames F3 and F4. In contrast, the second masking signal MS2 may be activated in the third and fourth frames F3 and F4 and may be deactivated in the first and second frames F1 and F2. Accordingly, the second masking circuit 342 may transfer the compensation scan signals SC_1 to SC_n to the even compensation scan lines SCL_E1 to SCL_En during the third and fourth frames F3 and F4 and may not transfer the compensation scan signals SC_1 to SC_n to the even compensation scan lines SCL_E1 to SCL_En during the first and second frames F1 and F2.

As such, even though a compensation scan driver outputs the compensation scan signals SC_1 to SC_n, the odd compensation scan signals SC_O1 to SC_On and the even compensation scan signals SC_E1 to SC_En may be alternately activated in units of at least one frame by first and second masking circuits.

According to some embodiments of the present disclosure, two driving transistors may be implemented in a pixel so as to alternately operate in units of at least one frame, and thus, a time capable of compensating for a hysteresis characteristic of each driving transistor may be secured. As such, a hysteresis characteristic that occurs when a driving transistor operates every frame may be suppressed, and thus, a phenomenon that an after-image is displayed in a display device may be prevented or reduced. This may mean that the overall display quality of the display device is relatively improved.

While the present disclosure has been described with reference to embodiments thereof, it will be apparent to those of ordinary skill in the art that various changes and modifications may be made thereto without departing from the spirit and scope of the present disclosure as set forth in the following claims, and their equivalents.

What is claimed is:

1. A display device comprising:
- a display panel including a pixel,
- wherein the pixel includes:
- a light emitting element;
- a first driving transistor connected between a first node and the light emitting element;
- a second driving transistor connected between the first node and the light emitting element;
- a switching transistor connected between a data line and the first node, and configured to receive a first scan signal;
- a first compensation transistor connected between a first control electrode of the first driving transistor and a second node, and configured to receive a first compensation scan signal; and
- a second compensation transistor connected between a second control electrode of the second driving transistor and the second node, and configured to receive a second compensation scan signal,
- wherein an active period of the first compensation scan signal does not overlap an active period of the second compensation scan signal,
- wherein the first driving transistor and the second driving transistor are commonly connected to the second node, and
- the first driving transistor and the second driving transistor are connected in parallel between the first node and the second node.

2. The display device of claim 1, wherein the display panel is configured to display an image during a plurality of frames,
- wherein the second compensation scan signal is maintained in an inactive state during a first frame of the plurality of frames,
- wherein the first compensation scan signal is maintained in the inactive state during a second frame of the plurality of frames, and
- wherein the active period of the first compensation scan signal is positioned in the first frame, and the active period of the second compensation scan signal is positioned in the second frame.

3. The display device of claim 2, wherein the first frame includes an odd-numbered frame of the plurality of frames, and
- wherein the second frame includes an even-numbered frame of the plurality of frames.

4. The display device of claim 2, wherein the pixel further includes:

a first initialization transistor connected between the first control electrode of the first driving transistor and a first initialization voltage line, and configured to receive a second scan signal; and a second initialization transistor connected between the second control electrode of the second driving transistor and a second initialization voltage line, and configured to receive the second scan signal.

5. The display device of claim 4, wherein the first initialization voltage line is configured to receive a first initialization voltage, wherein the second initialization voltage line is configured to receive a second initialization voltage, wherein, during the first frame, the first initialization voltage has a first voltage level, and the second initialization voltage has a second voltage level higher than the first voltage level, and wherein, during the second frame, the first initialization voltage has the second voltage level, and the second initialization voltage has the first voltage level.

6. The display device of claim 5, further comprising:

a first capacitor connected between the first control electrode of the first driving transistor and a driving voltage line; and a second capacitor connected between the second control electrode of the second driving transistor and the driving voltage line.

7. The display device of claim 6, wherein the driving voltage line is configured to receive a driving voltage, and wherein the second voltage level is the same as a voltage level of the driving voltage.

8. The display device of claim 5, wherein an active period of the first scan signal overlaps the active period of the first compensation scan signal during the first frame, and an active period of the second scan signal does not overlap the active period of the first compensation scan signal during the first frame, and wherein the active period of the first scan signal overlaps the active period of the second compensation scan signal during the second frame, and the active period of the second scan signal does not overlap the active period of the second compensation scan signal during the second frame.

9. The display device of claim 5, further comprising:

a third initialization transistor connected between the light emitting element and a third initialization voltage line, and configured to receive a third scan signal.

10. The display device of claim 9, wherein the third initialization voltage line is configured to receive a third initialization voltage, and wherein the third initialization voltage has a third voltage level different from the first voltage level.

11. The display device of claim 9, wherein an active period of the third scan signal overlaps an active period of the second scan signal.

12. The display device of claim 11, wherein the active period of the second scan signal comes before an active period of the first scan signal.

13. The display device of claim 4, further comprising:

a first emission control transistor connected between the first node and a driving voltage line, and configured to receive a first emission control signal; and a second emission control transistor connected between the light emitting element and the second node, and configured to receive a second emission control signal.

14. The display device of claim 13, wherein, during the first frame, an inactive period of the first and second emission control signals overlaps an active period of the first scan signal, the active period of the first compensation scan signal, and an active period of the second scan signal, and wherein, during the second frame, the inactive period of the first and second emission control signals overlaps the active period of the first scan signal, the active period of the second compensation scan signal, and the active period of the second scan signal.

15. The display device of claim 4, wherein the switching transistor and the first and second driving transistors are different in type from the first and second compensation transistors and the first and second initialization transistors.

16. The display device of claim 15, wherein each of the switching transistor and the first and second driving transistors includes a low-temperature polycrystalline silicon (LTPS) semiconductor layer, and wherein each of the first and second compensation transistors and the first and second initialization transistors includes an oxide semiconductor layer.

17. The display device of claim 15, wherein each of the switching transistor and the first and second driving transistors is a PMOS transistor, and wherein each of the first and second compensation transistors and the first and second initialization transistors is an NMOS transistor.

18. The display device of claim 15, wherein an active period of the first scan signal has a negative voltage level, each of the active period of the first compensation scan signal, the active period of the second compensation scan signal and an active period of the second scan signal has a positive voltage level.

19. The display device of claim 18, wherein, during the first frame, a duration of the active period of the first compensation scan signal is greater than a duration of the active period of the first scan signal, and wherein, during the second frame, a duration of the active period of the second compensation scan signal is greater than the duration of the active period of the second scan signal.

20. The display device of claim 2, further comprising a scan driver, wherein the scan driver includes:

a first compensation scan driver configured to output the first compensation scan signal and be deactivated during the second frame; and a second compensation scan driver configured to output the second compensation scan signal and be deactivated during the first frame.

21. The display device of claim 2, further comprising a scan driver, wherein the scan driver includes:

a compensation scan driver configured to output the first and second compensation scan signals;

a first masking circuit configured to mask an output of the second compensation scan signal during the first frame in response to a first masking signal; and a second masking circuit configured to mask an output of the first compensation scan signal during the second frame in response to a second masking signal.

* * * * *